United States Patent
DeBoer et al.

(10) Patent No.: US 11,243,074 B2
(45) Date of Patent: Feb. 8, 2022

(54) VEHICLE ALIGNMENT AND SENSOR CALIBRATION SYSTEM

(71) Applicant: BPG Sales and Technology Investments, LLC, Ada, MI (US)

(72) Inventors: David M. DeBoer, Grand Rapids, MI (US); Brecht Desmet, Machelen-Zulte (BE); Ryan M. Jefferies, Grand Rapids, MI (US); Jon D. Lawrence, Corvallis, OR (US); Thijs Pirmez, Sint-Andries (BE); Ward Van de Walle, Hansbeke (BE); Fredriek Vanneste, Staden (BE); Ben Wahlstrom, Austin, TX (US); Nicholas R. Nelson, Grand Rapids, MI (US)

(73) Assignee: BPG Sales and Technology Investments, LLC, Ada, MI (US)

( * ) Notice: Subject to any disclaimer, the term of this patent is extended or adjusted under 35 U.S.C. 154(b) by 0 days.

(21) Appl. No.: 16/926,664

(22) Filed: Jul. 11, 2020

(65) Prior Publication Data

US 2020/0348129 A1 Nov. 5, 2020

Related U.S. Application Data

(63) Continuation-in-part of application No. 16/398,404, filed on Apr. 30, 2019.
(Continued)

(51) Int. Cl.
*G01B 11/275* (2006.01)

(52) U.S. Cl.
CPC ...... *G01B 11/275* (2013.01); *G01B 2210/143* (2013.01); *G01B 2210/286* (2013.01)

(58) Field of Classification Search
CPC .... G01S 7/4026; G01S 7/4972; G01M 17/06; G01B 11/2755; G01B 11/272;
(Continued)

(56) References Cited

U.S. PATENT DOCUMENTS 3,630,623 A   12/1971   Schirmer
3,918,816 A   11/1975   Foster et al.
(Continued)

FOREIGN PATENT DOCUMENTS

CN   100373129   3/2008
DE   2948573   6/1981
(Continued)

OTHER PUBLICATIONS

Dürr AG: Adjustment of Driver Assistance Systems (DAS) for Commercial Vehicles, video at https://www.youtube.com/watch?v=7wdgc-RsewQ, Posted Jul. 31, 2015.
(Continued)

*Primary Examiner* — Luke D Ratcliffe
(74) *Attorney, Agent, or Firm* — Gardner, Linn, Burkhart & Ondersma LLP

(57) ABSTRACT

A system and method for aligning a target to a vehicle for calibration of a sensor equipped on the vehicle includes multiple non-contact wheel alignment sensors configured for use in determining the orientation of tire and wheel assemblies of the vehicle. A target adjustment frame includes a target mount moveably mounted on a base frame, and includes multiple actuators configured to selectively move the target mount relative to the base frame, where the base frame is in a known orientation to the non-contact wheel alignment sensors. A computer system selectively actuates the actuators to position a target relative to the vehicle, with the target mount being moveable about a plurality of axes based on the determination of the orienta-
(Continued)

tion of the vehicle relative to the target adjustment frame to position the target relative to a sensor of the vehicle whereby the sensor is able to be calibrated using the target.

20 Claims, 14 Drawing Sheets

Related U.S. Application Data

(60) Provisional application No. 63/040,083, filed on Jun. 17, 2020, provisional application No. 62/872,908, filed on Jul. 11, 2019, provisional application No. 62/664,323, filed on Apr. 30, 2018, provisional application No. 62/798,268, filed on Jan. 29, 2019.

(58) Field of Classification Search
CPC .......... G01B 2210/283; G01B 2210/12; G01B 2210/143; G01B 11/275; G01B 221/286
See application file for complete search history.

(56) References Cited

U.S. PATENT DOCUMENTS

| | | |
|---|---|---|
| 4,249,824 A | 2/1981 | Wiederrich et al. |
| 4,303,338 A | 12/1981 | Morrison et al. |
| 4,416,065 A | 11/1983 | Hunter |
| 4,444,496 A | 4/1984 | Dale, Jr. |
| 4,639,878 A | 1/1987 | Day et al. |
| 4,647,208 A | 3/1987 | Bieman |
| 4,690,557 A | 9/1987 | Wiklund |
| 4,724,480 A | 2/1988 | Hecker et al. |
| 4,726,122 A | 2/1988 | Andersson |
| 4,863,266 A | 9/1989 | Masuko et al. |
| RE33,144 E | 1/1990 | Hunter et al. |
| 4,899,218 A | 2/1990 | Waldecker et al. |
| 4,931,964 A | 6/1990 | Titsworth et al. |
| 5,018,853 A | 5/1991 | Hechel et al. |
| 5,044,746 A | 9/1991 | Henseli |
| 5,048,954 A | 9/1991 | Madey et al. |
| 5,054,918 A | 10/1991 | Downing et al. |
| 5,140,533 A | 8/1992 | Celette |
| 5,177,558 A | 1/1993 | Hill |
| 5,177,563 A | 1/1993 | Everett et al. |
| 5,198,877 A | 3/1993 | Schulz |
| 5,249,364 A | 10/1993 | Bishop |
| 5,259,246 A | 11/1993 | Stuyts |
| 5,268,731 A | 12/1993 | Fuchiwaki et al. |
| 5,274,433 A | 12/1993 | Madey et al. |
| 5,291,264 A | 3/1994 | Longa et al. |
| 5,489,983 A | 2/1996 | McClenahan et al. |
| 5,519,489 A | 5/1996 | McClenahan et al. |
| 5,532,816 A | 7/1996 | Spann et al. |
| 5,583,797 A | 12/1996 | Fluegge et al. |
| 5,600,893 A | 2/1997 | Phillips |
| 5,675,408 A | 10/1997 | Samuelsson et al. |
| 5,703,796 A | 12/1997 | Moradi et al. |
| 5,724,129 A | 3/1998 | Matteucci |
| 5,724,743 A | 3/1998 | Jackson |
| 5,731,870 A | 3/1998 | Bartko et al. |
| 5,760,938 A | 6/1998 | Hodge |
| 5,767,382 A | 6/1998 | Buchanan |
| 5,781,286 A | 7/1998 | Knestel |
| 5,812,256 A | 9/1998 | Chapin et al. |
| 5,815,257 A | 9/1998 | Haas |
| 5,818,574 A | 10/1998 | Jones et al. |
| 5,870,315 A | 2/1999 | January |
| 5,930,881 A | 8/1999 | Naruse et al. |
| 5,978,077 A | 11/1999 | Koerner et al. |
| 6,078,846 A | 6/2000 | Greer et al. |
| 6,100,923 A | 8/2000 | Sass et al. |
| 6,115,927 A | 9/2000 | Hendrix |
| 6,148,528 A | 11/2000 | Jackson |
| 6,161,419 A | 12/2000 | Langlechner |
| 6,226,879 B1 | 5/2001 | Baird |
| 6,285,959 B1 | 9/2001 | Greer |
| 6,363,619 B1 | 4/2002 | Schirmer et al. |
| 6,400,451 B1 | 6/2002 | Fukuda et al. |
| 6,404,486 B1 | 6/2002 | Nobis et al. |
| 6,412,183 B1 | 7/2002 | Uno |
| 6,424,411 B1 | 7/2002 | Rapidel et al. |
| 6,456,372 B1 | 9/2002 | Hudy |
| 6,473,978 B1 | 11/2002 | Maas |
| 6,483,577 B2 | 11/2002 | Stieff |
| 6,532,673 B2 | 3/2003 | Jahn et al. |
| 6,542,840 B2 | 4/2003 | Okamoto et al. |
| 6,545,750 B2 | 4/2003 | Roth et al. |
| 6,559,936 B1 | 5/2003 | Colombo et al. |
| 6,640,612 B2 | 11/2003 | Corghi |
| 6,657,711 B1 | 12/2003 | Kitagawa et al. |
| 6,658,749 B2 | 12/2003 | Jackson et al. |
| 6,658,751 B2 | 12/2003 | Jackson et al. |
| 6,690,456 B2 | 2/2004 | Bux et al. |
| 6,691,062 B1 | 2/2004 | Nobis |
| 6,707,557 B2 | 3/2004 | Young, Jr. et al. |
| 6,710,866 B1 | 3/2004 | Adolph |
| 6,714,291 B2 | 3/2004 | Castagnoli et al. |
| 6,731,382 B2 | 5/2004 | Jackson et al. |
| 6,744,497 B2 | 6/2004 | Burns, Jr. |
| 6,748,796 B1 | 6/2004 | Van Den Bossche |
| 6,765,664 B2 | 7/2004 | Groothuis et al. |
| 6,796,035 B2 | 9/2004 | Jahn et al. |
| 6,796,043 B2 | 9/2004 | Jackson et al. |
| 6,802,130 B2 | 10/2004 | Podbielski et al. |
| 6,813,015 B2 | 11/2004 | Knoedler et al. |
| 6,823,598 B1 | 11/2004 | Loescher |
| 6,823,601 B2 | 11/2004 | Murray |
| 6,829,046 B1 | 12/2004 | Groothuis et al. |
| 6,836,970 B2 | 1/2005 | Hirano |
| 6,839,972 B2 | 1/2005 | Jackson et al. |
| 6,842,238 B2 | 1/2005 | Corghi |
| 6,879,403 B2 | 4/2005 | Freifeld |
| 6,912,477 B2 | 6/2005 | Murray |
| 6,915,228 B2 | 7/2005 | Uffenkamp et al. |
| 6,931,340 B2 | 8/2005 | Jackson et al. |
| 6,959,253 B2 | 10/2005 | Jackson et al. |
| 6,968,282 B1 | 11/2005 | Jackson et al. |
| 7,062,861 B2 | 6/2006 | O'Mahony et al. |
| 7,065,462 B2 | 6/2006 | Merrill et al. |
| 7,075,635 B2 | 7/2006 | Groothuis et al. |
| 7,121,011 B2 | 10/2006 | Murray et al. |
| 7,230,694 B2 | 6/2007 | Forster et al. |
| 7,265,821 B1 | 9/2007 | Lawrence et al. |
| 7,331,211 B2 | 2/2008 | Harrill |
| 7,352,455 B2 | 4/2008 | Groothuis et al. |
| 7,380,344 B2 | 6/2008 | Dietrich |
| 7,382,913 B2 | 6/2008 | Dorrance et al. |
| 7,424,387 B1 | 9/2008 | Gill et al. |
| 7,501,980 B2 | 3/2009 | Focke et al. |
| 7,535,558 B2 | 5/2009 | Uffenkamp et al. |
| 7,570,352 B2 | 8/2009 | Flannigan et al. |
| 7,778,748 B2 | 8/2010 | Probst et al. |
| 7,779,544 B2 | 8/2010 | Tentrup et al. |
| 7,864,309 B2 | 1/2011 | De Sloovere et al. |
| 7,907,265 B2 | 3/2011 | Tentrup et al. |
| 7,908,751 B2 | 3/2011 | Nobis et al. |
| 7,974,806 B1 | 7/2011 | Burns et al. |
| 8,096,057 B2 | 1/2012 | Schommer et al. |
| 8,107,062 B2 | 1/2012 | De Sloovere et al. |
| 8,127,599 B2 | 3/2012 | Schommer et al. |
| 8,131,017 B2 | 3/2012 | Bux et al. |
| 8,135,514 B2 | 3/2012 | Kelly et al. |
| 8,150,144 B2 | 4/2012 | Nobis et al. |
| 8,196,461 B2 | 6/2012 | Abraham et al. |
| 8,244,024 B2 | 8/2012 | Dorrance et al. |
| 8,254,666 B2 | 8/2012 | Uffenkamp et al. |
| 8,274,648 B2 | 9/2012 | Corghi |
| 8,363,979 B2 | 1/2013 | Abraham et al. |
| 8,400,624 B2 | 3/2013 | De Sloovere et al. |
| 8,418,543 B2 | 4/2013 | Tentrup et al. |
| 8,448,342 B2 | 5/2013 | Nobis et al. |
| 8,452,552 B2 | 5/2013 | Nobis et al. |
| 8,457,925 B1 | 6/2013 | Stieff et al. |
| 8,489,353 B2 | 7/2013 | Raphael |

(56) References Cited

U.S. PATENT DOCUMENTS

| | | |
|---|---|---|
| 8,492,701 B2 | 7/2013 | Nobis et al. |
| 8,522,609 B2 | 9/2013 | Nobis et al. |
| 8,538,724 B2 | 9/2013 | Corghi |
| 8,578,765 B2 | 11/2013 | Nobis et al. |
| 8,638,452 B2 | 1/2014 | Muhle et al. |
| 8,650,766 B2 | 2/2014 | Nobis et al. |
| 8,836,764 B2 | 9/2014 | Gruetzmann et al. |
| 8,854,454 B2 | 10/2014 | Abraham et al. |
| 8,918,302 B2 | 12/2014 | Hukkeri et al. |
| 9,001,189 B2 | 4/2015 | Nobis et al. |
| 9,127,937 B2 | 9/2015 | Nobis et al. |
| 9,134,120 B2 | 9/2015 | Schommer et al. |
| 9,170,101 B2 | 10/2015 | Stieff |
| 9,182,477 B2 | 11/2015 | Jones et al. |
| 9,212,907 B2 | 12/2015 | D'Agostino et al. |
| 9,279,670 B2 | 3/2016 | Schommer et al. |
| 9,279,882 B2 | 3/2016 | Hukkeri et al. |
| 9,448,138 B2 | 9/2016 | Stieff et al. |
| 9,539,866 B2 | 1/2017 | Mouchet |
| 9,545,966 B2 | 1/2017 | Kim |
| 9,581,524 B2 | 2/2017 | Liu |
| 9,645,051 B2 | 5/2017 | Jin |
| 9,658,062 B2 | 5/2017 | Duff et al. |
| 9,779,560 B1 | 10/2017 | Dorrance et al. |
| 9,779,561 B1 | 10/2017 | Dorrance et al. |
| 9,791,268 B2 | 10/2017 | Buzzi et al. |
| 10,001,429 B2 | 6/2018 | Krueger et al. |
| 10,068,389 B1 | 9/2018 | Strege et al. |
| 10,139,213 B2 | 11/2018 | Herrmann et al. |
| 10,222,455 B1 | 3/2019 | Stieff et al. |
| 10,240,916 B1 | 3/2019 | Golab et al. |
| 10,241,195 B1 | 3/2019 | Stieff et al. |
| 10,284,777 B2 | 5/2019 | Rogers et al. |
| 10,298,814 B2 | 5/2019 | Harrell et al. |
| 10,347,006 B2 | 7/2019 | Kunert et al. |
| 10,365,095 B2 | 7/2019 | D'Agostino et al. |
| 10,444,010 B2 | 10/2019 | Strege et al. |
| 10,475,201 B1 | 11/2019 | Hall et al. |
| 10,514,323 B2 | 12/2019 | Corghi |
| 10,567,650 B2 | 2/2020 | Rogers et al. |
| 10,670,392 B2 | 6/2020 | Rogers et al. |
| 10,684,125 B2 | 6/2020 | D'Agostino et al. |
| 10,692,241 B2 | 6/2020 | Kunert et al. |
| 10,692,308 B2 | 6/2020 | Cho et al. |
| 10,697,766 B1 | 6/2020 | Dorrance et al. |
| 10,848,316 B1 | 11/2020 | Stieff et al. |
| 10,871,368 B2 | 12/2020 | Krueger |
| 2005/0022587 A1 | 2/2005 | Tentrup et al. |
| 2006/0090356 A1 | 5/2006 | Stieff |
| 2006/0279728 A1* | 12/2006 | Dorrance .......... G01B 11/2755 356/139.03 |
| 2008/0186514 A1 | 8/2008 | Uffenkamp et al. |
| 2009/0046279 A1 | 2/2009 | Tentrup et al. |
| 2010/0060885 A1 | 3/2010 | Nobis et al. |
| 2010/0238291 A1 | 9/2010 | Pavlov et al. |
| 2011/0271749 A1 | 11/2011 | Tentrup et al. |
| 2013/0325252 A1* | 12/2013 | Schommer .......... G01S 7/52004 701/33.1 |
| 2014/0253908 A1 | 9/2014 | Lee |
| 2015/0049188 A1 | 2/2015 | Harrell et al. |
| 2015/0049199 A1 | 2/2015 | Rogers et al. |
| 2015/0134191 A1 | 5/2015 | Kim |
| 2016/0334209 A1 | 11/2016 | Linson |
| 2017/0003141 A1* | 1/2017 | Voeller .................. G01C 25/00 |
| 2018/0060036 A1 | 3/2018 | Frisch et al. |
| 2018/0075675 A1 | 3/2018 | Kim |
| 2018/0094922 A1 | 4/2018 | Oki et al. |
| 2018/0100783 A1 | 4/2018 | Stieff et al. |
| 2018/0134529 A1 | 5/2018 | Zecher et al. |
| 2018/0188022 A1 | 7/2018 | Leikert |
| 2018/0259424 A1 | 9/2018 | Tentrup |
| 2018/0276910 A1 | 9/2018 | Pitt et al. |
| 2018/0299533 A1 | 10/2018 | Pliefke et al. |
| 2019/0204184 A1 | 7/2019 | Neumann et al. |
| 2019/0222723 A1 | 7/2019 | Harrell et al. |
| 2019/0249985 A1* | 8/2019 | Stieff .................. G01S 7/4026 |
| 2019/0279395 A1 | 9/2019 | Kunert et al. |
| 2019/0331482 A1 | 10/2019 | Lawrence et al. |
| 2020/0088515 A1 | 3/2020 | Rogers et al. |
| 2020/0130188 A1 | 4/2020 | Lawrence et al. |
| 2020/0141724 A1 | 5/2020 | Lawrence et al. |
| 2020/0309517 A1 | 10/2020 | D'Agostino et al. |
| 2020/0320739 A1 | 10/2020 | Kunert et al. |

FOREIGN PATENT DOCUMENTS

| | | |
|---|---|---|
| DE | 19857871 | 10/2000 |
| DE | 102009009046 | 10/2009 |
| DE | 102009015207 | 9/2010 |
| EP | 0593066 | 4/1994 |
| EP | 0593067 | 4/1994 |
| EP | 0994329 | 4/2000 |
| EP | 1376051 | 1/2001 |
| EP | 1221584 | 7/2002 |
| EP | 1260832 | 11/2002 |
| EP | 1505363 | 2/2005 |
| EP | 946857 B1 | 7/2005 |
| EP | 943890 B1 | 2/2007 |
| EP | 1295087 B1 | 8/2010 |
| EP | 1818748 | 5/2014 |
| EP | 3084348 B1 | 3/2017 |
| EP | 3036516 B1 | 4/2018 |
| EP | 3228976 B1 | 11/2020 |
| FR | 2808082 | 10/2001 |
| KR | 101510336 B1 | 4/2015 |
| WO | 2000071972 | 11/2000 |
| WO | 0231437 A1 | 4/2002 |
| WO | 2008014783 | 2/2008 |
| WO | 2008086773 A1 | 7/2008 |
| WO | 2010138543 | 12/2010 |
| WO | 2013079395 A1 | 6/2013 |
| WO | 2018035040 A1 | 2/2018 |
| WO | 2018067354 A1 | 4/2018 |
| WO | 2018153723 | 8/2018 |
| WO | 2018158073 | 9/2018 |
| WO | 2018167809 | 9/2018 |
| WO | 2018188931 | 10/2018 |
| WO | 2020056303 A1 | 3/2020 |

OTHER PUBLICATIONS

International Search Report and Written Opinion of the International Searching Authority from corresponding Patent Cooperation Treaty (PCT) Application No. PCT/IB2020/056533, indicated completed on Oct. 7, 2020.

* cited by examiner

VEHICLE ALIGNMENT AND SENSOR CALIBRATION SYSTEM

CROSS REFERENCE TO RELATED APPLICATION

The present application claims priority of U.S. provisional application Ser. No. 62/872,908 filed Jul. 11, 2019 and claims priority of U.S. provisional application Ser. No. 63/040,083 filed Jun. 17, 2020, and is a continuation-in-part of U.S. application Ser. No. 16/398,404 filed Apr. 30, 2019, which claims priority of U.S. provisional application Ser. No. 62/664,323 filed Apr. 30, 2018, and claims priority of U.S. provisional application Ser. No. 62/798,268 filed Jan. 29, 2019, which are all hereby incorporated herein by reference in their entireties.

BACKGROUND AND FIELD OF THE INVENTION

The present invention is directed to a system for aligning a vehicle, including for calibration of sensors on the vehicle relative to one or more calibration targets.

The use of radar, imaging systems, and other sensors, such as LIDAR, ultrasonic, and infrared (IR) sensors, to determine range, velocity, and angle (elevation or azimuth) of objects in an environment are important in a number of automotive safety systems, such as an Advanced Driver Assistance System (ADAS) for a vehicle. A conventional ADAS system will utilize one or more sensors. While these sensors are aligned and/or calibrated by the manufacturer during production of the vehicle whereby they are able to provide accurate driver assistance functionality, the sensors may need realignment or recalibration periodically, such as due to the effects of wear and tear, or misalignment due to driving conditions or through mishap, such as a collision.

SUMMARY OF THE INVENTION

The present invention provides a method and system for calibrating and/or aligning a vehicle-equipped sensor by determining the alignment of the vehicle tire and wheel assemblies using non-contact wheel alignment sensors. The orientation of the vehicle is determined, such as relative to the non-contact wheel alignment sensors, whereby a calibration target may be aligned with the vehicle equipped sensor, whereupon the vehicle equipped sensor may be calibrated, such as in accordance with specifications set by the vehicle manufacturer.

According to an aspect of the present invention, a system for aligning a target to a vehicle for calibration of a sensor equipped on the vehicle includes a plurality of non-contact wheel alignment sensors configured for use in determining the orientation of tire and wheel assemblies of the vehicle relative. The system further includes a target adjustment frame including a base frame, a target mount moveably mounted on the target adjustment frame with the target mount configured to support a target, the target adjustment frame further including a plurality of actuators configured to selectively move the target mount relative to the base frame, wherein the target adjustment frame is in a known orientation, such as relative to the non-contact wheel alignment sensors or a lift supporting the non-contact wheel alignment sensors. Also included is a computer system configured to selectively actuate the actuators to position the target relative to the vehicle positioned in front of the target adjustment frame, with the target mount being moveable by the actuators longitudinally and laterally with respect to a longitudinal axis of the vehicle when positioned in front of the target adjustment frame, vertically, and rotationally about a vertical axis. The computer system is configured to determine the orientation of the vehicle relative to the target adjustment frame based on the orientation of the tire and wheel assemblies of the vehicle and to actuate the actuators responsive to the determination of the orientation of the vehicle relative to the target adjustment frame to position the target relative to a sensor of the vehicle whereby the sensor is able to be calibrated using the target.

In particular embodiments the system includes a vehicle lift to which the non-contact wheel alignment sensors are mounted. Non-contact wheel alignment sensors may be provided to determine the orientation of each tire and wheel assembly of the vehicle, and the non-contact wheel alignment sensors may be movable laterally and/or longitudinally relative to the vehicle.

The computer system may include at least one controller local to the non-contact wheel alignment sensors and/or to the target frame. Still further, the computer system may include a remote computer accessible by the one or more controllers via an Internet.

Still further, the base frame of the target adjustment frame is longitudinally moveable relative to the non-contact wheel alignment sensors, such as by being longitudinally moveable upon at least one rail.

According to a further aspect of the present invention, a method of aligning a target to a vehicle for calibration of a sensor equipped on the vehicle includes determining the orientation of tire and wheel assemblies of the vehicle using non-contact wheel alignment sensors, and positioning a target held by a target adjustment frame relative to the vehicle based on the determined orientation of the tire and wheel assemblies of the vehicle, where the steps of determining the orientation of tire and wheel assemblies and positioning a target held by the target adjustment frame may be performed using the above noted system.

The present invention provides a system and method for accurately positioning a calibration target relative to a sensor of a vehicle and calibrating the sensor, such as in accordance with OEM specifications. The accurate positioning and calibration of the sensor thus aids in optimizing the performance of the sensor to in turn enable the sensor to perform its ADAS functions. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
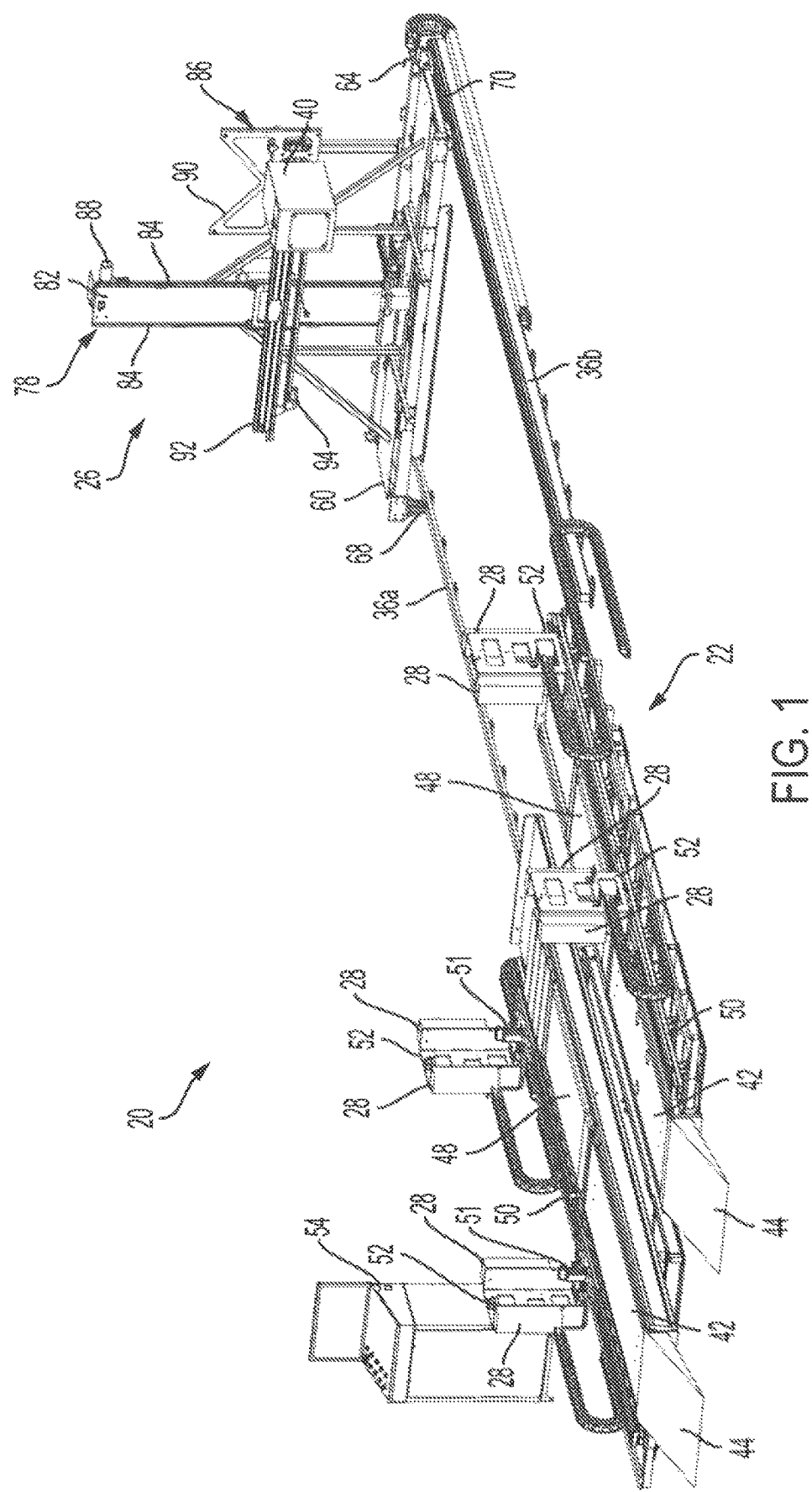
FIG. 1 is a perspective view of a vehicle alignment system in accordance with aspects of the present invention shown with a lift in a lowered orientation.
Figure 5:
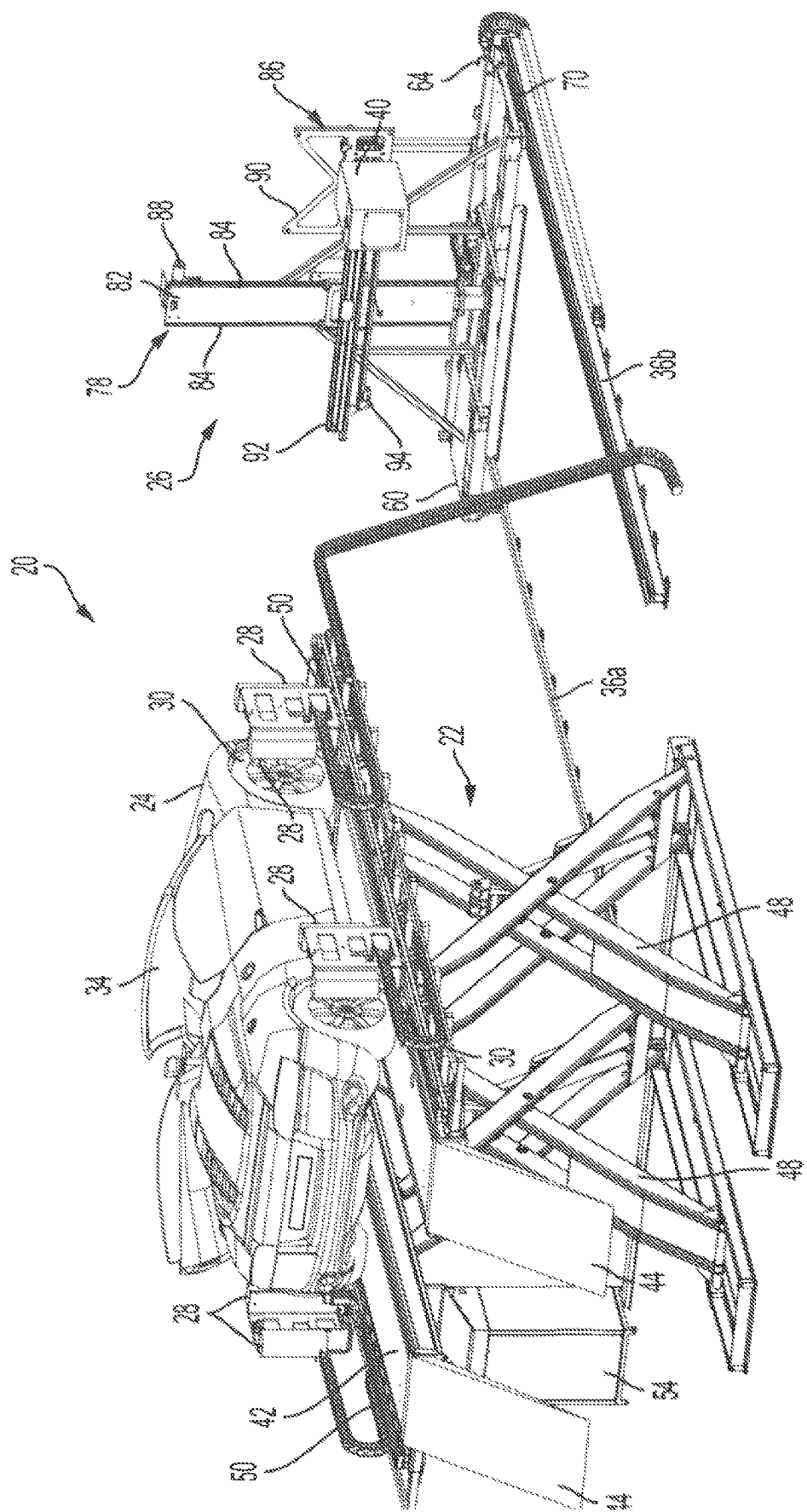
FIG. 5 is a perspective view of the system of FIG. 1 shown with the vehicle positioned on turning plates on the lift in a raised position.

FIG. 1 illustrates an exemplary vehicle alignment and sensor calibration system 20 in accordance with the present invention. In general, a vehicle lift 22 supports a vehicle 24 with a target adjustment frame or stand 26 positioned in front of lift 22 and with lift 22 including non-contact wheel alignment sensors 28 disposed about vehicle 24. Sensors 28 operate to determine alignment information regarding tire and wheel assemblies 30 of vehicle 24, along with position information of vehicle 24 on lift 22. Based on an established and known orientation of lift 22 relative to target frame 26, target frame 26 may be used to position one or more targets 32 supported on target frame 26, and in particular to align targets 32 relative to one or more ADAS sensors 34 of vehicle 24, including by moving target frame 26 along rails 36a, 36b longitudinally relative to lift 22 and vehicle 24. In the illustrated embodiment sensor 34 is mounted at or near the windshield of vehicle 24. It should be understood, however, that ADAS sensors may be radar sensors for adaptive cruise control ("ACC"), imaging systems such as camera sensors for lane departure warning ("LDW") and other ADAS camera sensors disposed about vehicle, as well as other sensors, such as LIDAR, ultrasonic, and infrared ("IW") sensors of an ADAS system, including sensors mounted inside the vehicle, such as forward facing cameras, or exterior mounted sensors, with the targets supported on stand 26 constructed for calibration of such sensors, including grids, patterns, trihedrals, and the like. Upon aligning the target or targets with the sensor or sensors of the vehicle, a calibration routine is performed whereby the sensor is calibrated or aligned using the corresponding target. System 20 is additionally usable by an operator 38 in the setting of the vehicle alignment by adjustment of tire and wheel assemblies 30 when lift 22 is in an elevated or raised orientation (FIG. 5). Still further, system 20 is additionally used for checking and or setting the position or aim of the headlight or other lights of vehicle 24 by way of a vehicle light aimer sensor 40 that is mountable to target frame 26 (FIG. 12), as well as checking vehicle height information. Accordingly, system 20 is useful in vehicle repair and maintenance procedures, such as for example after a collision or other occurrence in which aspects of the vehicle require checking and/or adjustment.

With initial reference to FIGS. 1-6, lift 22 of system 20 is disclosed as including in the illustrated embodiment spaced apart runways 42 for supporting the tire and wheel assemblies 30 of vehicle 24, as well as ramps 44 to enable vehicle 24 to drive onto runways 42. Runways 42 in turn include float plates or turning plates 46 upon which the front tire and wheel assemblies 30 of vehicle 24 are positioned (FIGS. 4 and 5) in the process of measuring and setting the alignment of vehicle 24. In the illustrated embodiment lift 22 is disclosed as a scissors lift having scissor leg or lift assemblies 48 (FIG. 5) supporting each runway 42, whereby when elevated a space or gap between the runways 42 is provided so as to enable operator 38 access beneath vehicle 24. It should be appreciated, however, that alternative lifts may be employed, including single post or four post lifts.

As noted, lift 22 includes non-contact wheel alignment sensors 28 mounted thereto, with the illustrated embodiment including four pairs of sensors 28, where each of the separate pairs of sensors 28 are moveable longitudinally on lift 22 so as to be disposed adjacent a separate wheel and tire assembly 30 of vehicle 24. As discussed in more detail below, sensors 28 are moveable longitudinally on lift 22 so as to measure orientation of wheel and tire assemblies 30 in more than one position of vehicle 24 on lift 22, as well as to be used with vehicles having differing wheelbases. That is the two pairs of sensors 28 at each runway 42 may be synchronously moved together so as to maintain the spacing between each pair of sensors 28, as well as moved independently of each other to increase or decrease the spacing between the two pair of sensors 28 at each runway to as to accommodate different vehicles. In particular, in the illustrated embodiment, lift 22 includes longitudinal rails 50 adjacent the outside of each runway 42 and extending parallel with runways 42, with mounts 52 for sensors 28 being longitudinally moveable along rails 50.

As shown, each mount 52 supports two sensors 28. Mounts 52 may additionally accommodate lateral movement of the supported sensors 28, such as by way of lateral rails, adjustable or adjustment plates, or the like. That is, laterally aligned pairs of sensors 28 on each runway 42 may be laterally adjusted to accommodate or compensate for vehicles of differing widths. In the illustrated embodiment, however, as discussed below, sensors 28 are configured and operate so as to be able to measure the orientation of wheel and tire assemblies 30 over a wide range of lateral positions of the wheel and tire assembly 30 relative to the sensor 28. As such, sensors 28 are able to accommodate vehicles of differing widths, as well as situations in which the vehicle 24 is not laterally centered on runways 42. For example, accommodating situations in which the vehicle 24 is disposed on runways 42 with its left side closer to the outside edge of the left runway or its right side closer to the outside edge of the right runway.

Actuators 51 are provided at each mount 52 for moving the mounts 52 longitudinally along rails 50, where in the illustrated embodiment actuators 51 are electrical linear actuators. Alternatively, geared tracks, adjustment screws, hydraulic or pneumatic piston actuators, or the like may be employed. Similarly, such actuators may be employed for moving the mounts 52 and/or sensors 28 laterally. Alternatively, the sensors and/or mounts 52 may be manually positionable by operator 38.

In the illustrated embodiment each sensor 28 is constructed and operates as a non-contact wheel alignment sensor as disclosed in pending U.S. provisional patent application Ser. No. 63/016,064, filed on Apr. 27, 2020, which is incorporated herein by reference. Alternatively, each sensor 28 may be constructed and/or operate in accordance with any of U.S. Pat. Nos. 7,864,309, 8,107,062 and 8,400,624, which are incorporated herein by reference.

In the illustrated embodiment, each sensor 28 includes a light projector for projecting a pattern onto the tire and wheel assemblies 30, with one sensor 28 of a given pair of sensors 28 projecting onto a portion of the tire to the left of the center of the wheel and the other sensor 28 projecting onto a portion of the tire to the right of the center of the wheel. For example, as understood from FIGS. 2A and 2B, in the illustrated embodiment each sensor 28a, 28b of a pair of sensors projects a pattern 53 of light, shown as parallel lines, onto a tire and wheel assembly 30a of vehicle 24a, with one sensor 28a projecting onto a left side portion 31a of the assembly 30a and the other sensor 28b projecting onto the right side portion 31b of assembly 30a. Each sensor 28 additionally includes a digital camera for imaging the light reflected from the tire and wheel assembly that the given sensor 28 projected thereon, as well as includes a processor for processing the reflected images. The use of parallel lines provides a greater depth of view of sensors 28 by enabling the sensors 28 to view tire and wheel assemblies 30 that are further or closer to sensors 28. The resulting reflected images from each sensor 28 are then processed, such as by way of a central controller or computer 54 to obtain the alignment or orientation of each wheel tire and wheel assembly 30, as well as to determine an accurate orientation of vehicle 24 on lift 22, which may include, for example, determining the orientation of the vertical center plane of vehicle 24. The alignment determination may include, for example, determining points along the projected patterns 53 to determine a crown of the bulge of the tire so as to determine a circle 55a in three-dimensional space representative of the tire and wheel assembly, as well as determination of a center point 55b of the tire and wheel assembly, and/or determination of a plane 55c representative of the tire and wheel assembly (see FIG. 2B). The orientation of vehicle 24 is thus determinable based on the known position or orientation of each tire and wheel assembly 30 in a three-dimensional coordinate frame, including based on the center points 55b of assemblies 30.

It should be appreciated that alternatively constructed non-contact wheel alignment sensors may be employed, and that alternative arrangements of non-contact wheel alignment sensors may be employed within the scope of the present invention, including more or fewer sensors on each side of lift 22. For example, rather than have separate non-contact wheel alignment sensors arranged for both wheel assemblies 30 on the same side of the vehicle, in an alternative arrangement a single sensor arrangement may be employed on each side for separately measuring both the front and rear wheel assemblies 30. In such an arrangement the longitudinal rails 50 may enable the separate positioning of the sensor arrangement at both the front and rear wheel assemblies 30. Alternatively to using two sensors 28 at each tire and wheel assembly 30, a single sensor may be employed at each tire and wheel assembly, for example a single sensor that is able to project over the entirety of the tire and wheel assembly. Moreover, non-contact wheel alignment sensors with alternative projection patterns, camera arrangements and/or other configurations may be employed. Still further, non-contact wheel alignment sensors with expanded fields of vision that operate to determine alignment and vehicle position information while a vehicle is moving through a field of vision may be employed, such as for example as disclosed in U.S. Pat. No. 9,677,974, which is incorporated herein by reference. An alternative system employing such non-contact wheel alignment sensors may measure wheel alignment as a vehicle is moved over a given distance, such as from a first position to a second position on runways 42 rather than separate measurements at different positions.

In operation, a diagnostic reader device may initially be connected to vehicle 24, such as by being plugged into an onboard diagnostic ("OBD") port of vehicle 24 so as to obtain information regarding vehicle 24, such as information regarding the vehicle make and model, year, information regarding the ADAS sensors on vehicle 24, and/or information regarding the size of the tire and wheel assemblies 30. Such information may be acquired via accessing one or more electronic control units ("ECUs") of vehicle 24 and may be acquired by computer 54 directly, or may be obtained by an alternative portable controller or computing device 56 for use by operator 38, such as a tablet computer, and transmitted to computer 54, or may be used by computing device 56 independently of computer 54. Still further, operator 38 may be prompted by a program on computer 54 and/or 56 to manually enter information, such as the tire size of the tire and wheel assemblies 30. It should be appreciated that such information may then be used in the alignment setting and sensor calibration of vehicle 24, as discussed in more detail below, and may be obtained prior to vehicle 24 driving onto lift 22 or once the vehicle 24 is driven onto lift 22. Alternatively to obtaining vehicle information via an OBD port, operator 38 may enter information into computer 54 and/or 56.

Figure 2:
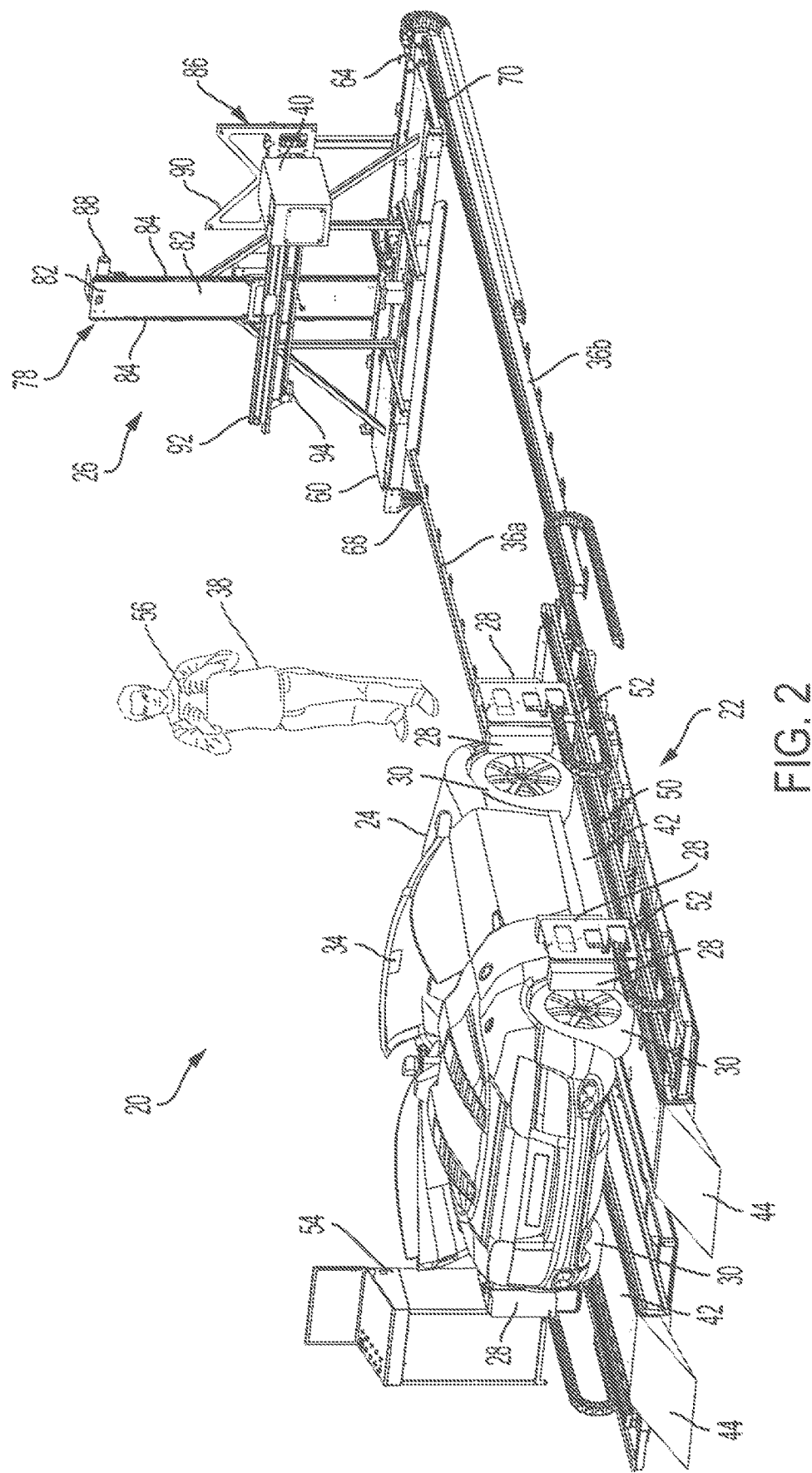
FIG. 2 is a perspective view of the system of FIG. 1 shown with a vehicle in a first position on the lift in a lowered position.
Figure 2A:
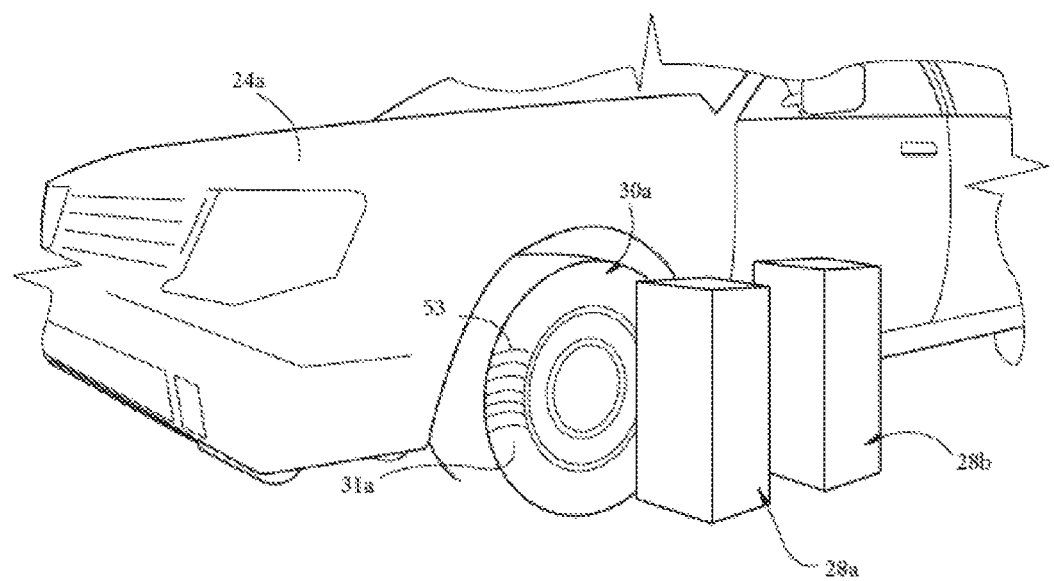
FIG. 2A is a perspective view of non-contact wheel alignment sensors of the system of FIG. 1 shown adjacent a tire and wheel assembly of a vehicle.
Figure 2B:
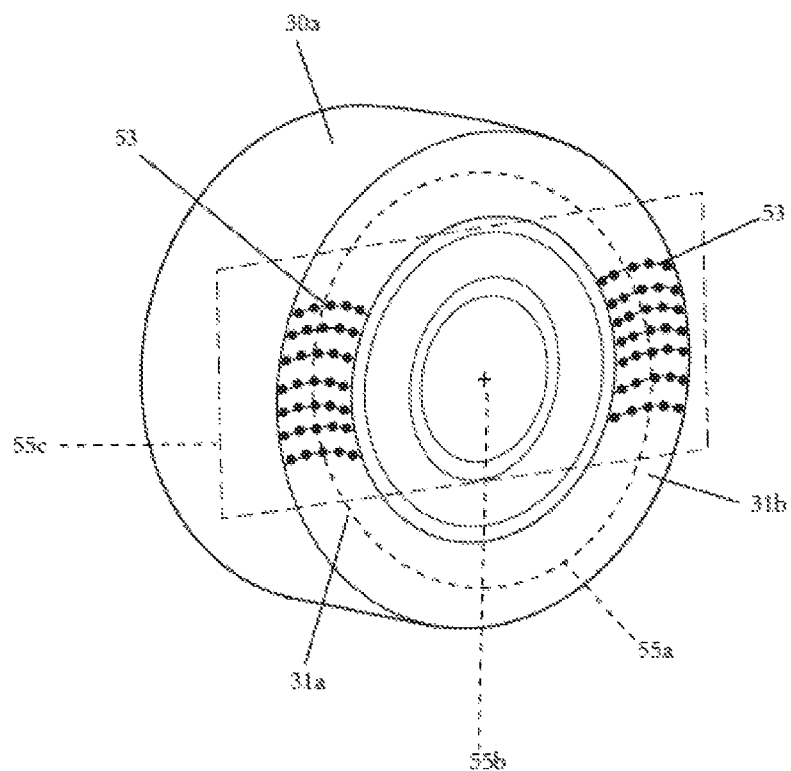
FIG. 2B is a perspective view of a tire and wheel assembly of FIG. 2A illustrating aspects of a non-contact wheel alignment sensor.

Vehicle 24 is driven onto runways 42 via ramps 44 when lift 22 is in a lowered orientation and is then initially driven or manually pushed into a first or an initial position as shown in FIG. 2. With vehicle 24 in the first position, the four sets of sensors 28 may be moved along rails 50 as needed so as to be disposed adjacent to or aligned with each of the four tire and wheel assemblies 30. Alternatively, upon computer 54 and/or 56 obtaining information regarding vehicle 24, sensors 28 may be moved into the first position with vehicle 24 then being manually pushed by operator 38 so as to align the tire and wheel assemblies 30 with the positioned sensors 28. In the illustrated embodiment the alignment of the sensors 28 with the tire and wheel assemblies 30 is obtained with a left one of the pairs of sensors 28 projecting on the portion left of the center of a given tire and wheel assembly 30 and the right one of the pairs of sensors projecting on the portion right of the center of the tire and wheel assembly 30. The sensors 28 are thereby used to determine the wheel alignment or orientation of the four tire and wheel assemblies 30, including the center of each tire and wheel assembly 30, as well as the position of vehicle 24 on runways 42 of lift 22.

Figure 3:
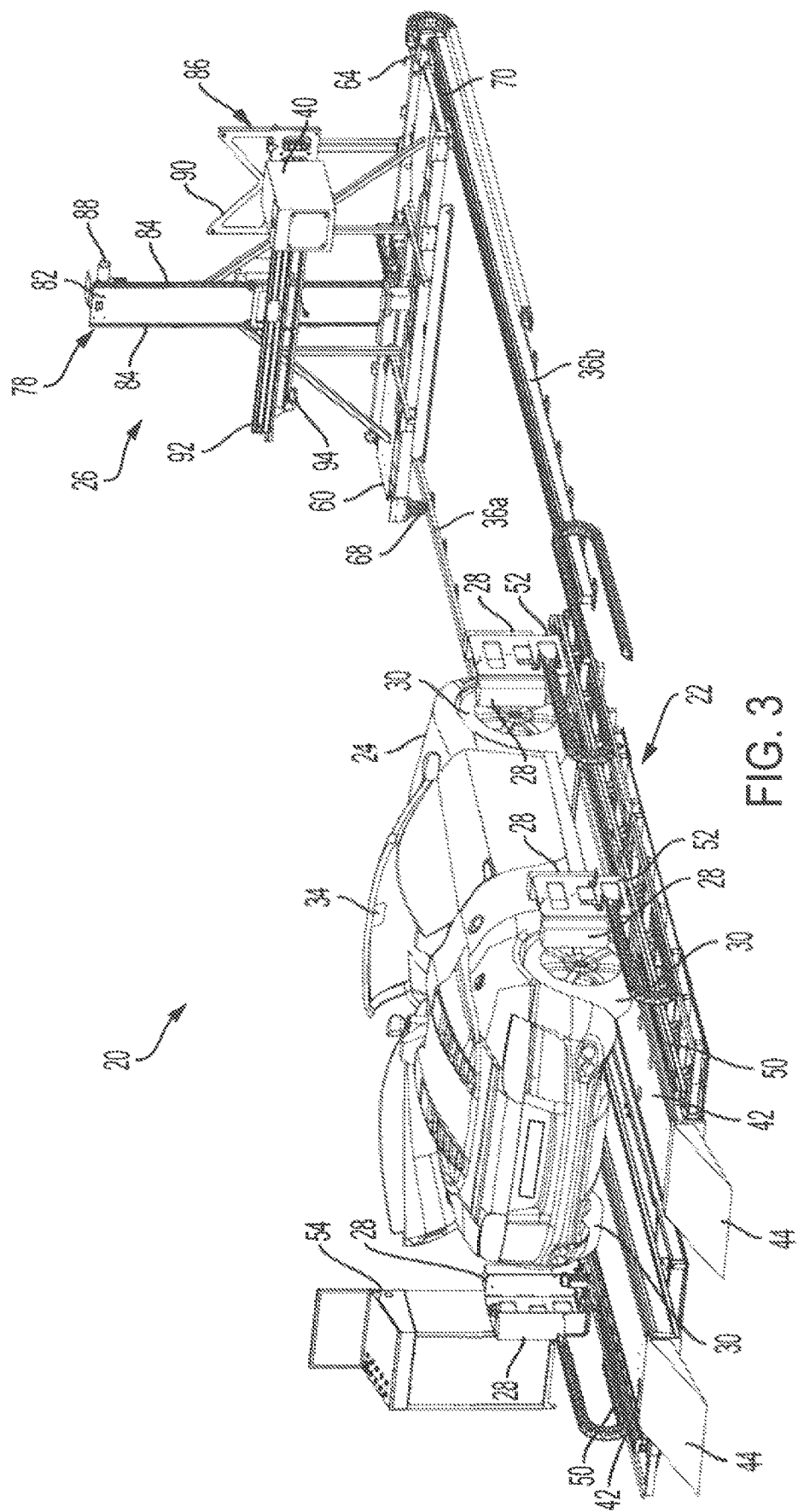
FIG. 3 is a perspective view of the system of FIG. 1 shown with the vehicle in a second position on the lift in a lowered position.

Vehicle 24 is subsequently moved into a second or subsequent position, which in the illustrated embodiment as shown in FIG. 3 is forward of the first position. Correspondingly, the four sets of sensors 28 are moved forward along rails 50 so as to be disposed adjacent to or aligned with each of the four tire and wheel assemblies 30 in the second position. Alternatively, upon determining the wheel alignment information of the tire and wheel assemblies 30 in the first position, computer 54 may automatically move sensors 28 into the appropriate second position based on the vehicle information obtained by computer 54 and/or 56 regarding vehicle 24, with vehicle 24 then being manually pushed by operator 38 so as to align the tire and wheel assemblies 30 with the re-positioned sensors 28 in the second position. In either case, sensors 28 are again used to determine the wheel alignment or orientation of the four tire and wheel assemblies 30 and the position of vehicle 24 on runways 42 of lift 22 in the second position.

The determination of the wheel alignment of the tire and wheel assemblies in two positions, along with the movement of the vehicle 24 such that the tire and wheel assemblies 30 are rotationally re-positioned, provides the ability to obtain toe measurement of the tire and wheel assemblies 30 with runout compensation. In particular, the two sets of determinations enable system 20 to determine runout-compensated thrust angle of vehicle 24 whereby, as discussed in more detail below, a target 32 on target adjustment stand 26 may be positioned into a desired orientation for calibration of one or more sensors on vehicle 24.

Figure 4:
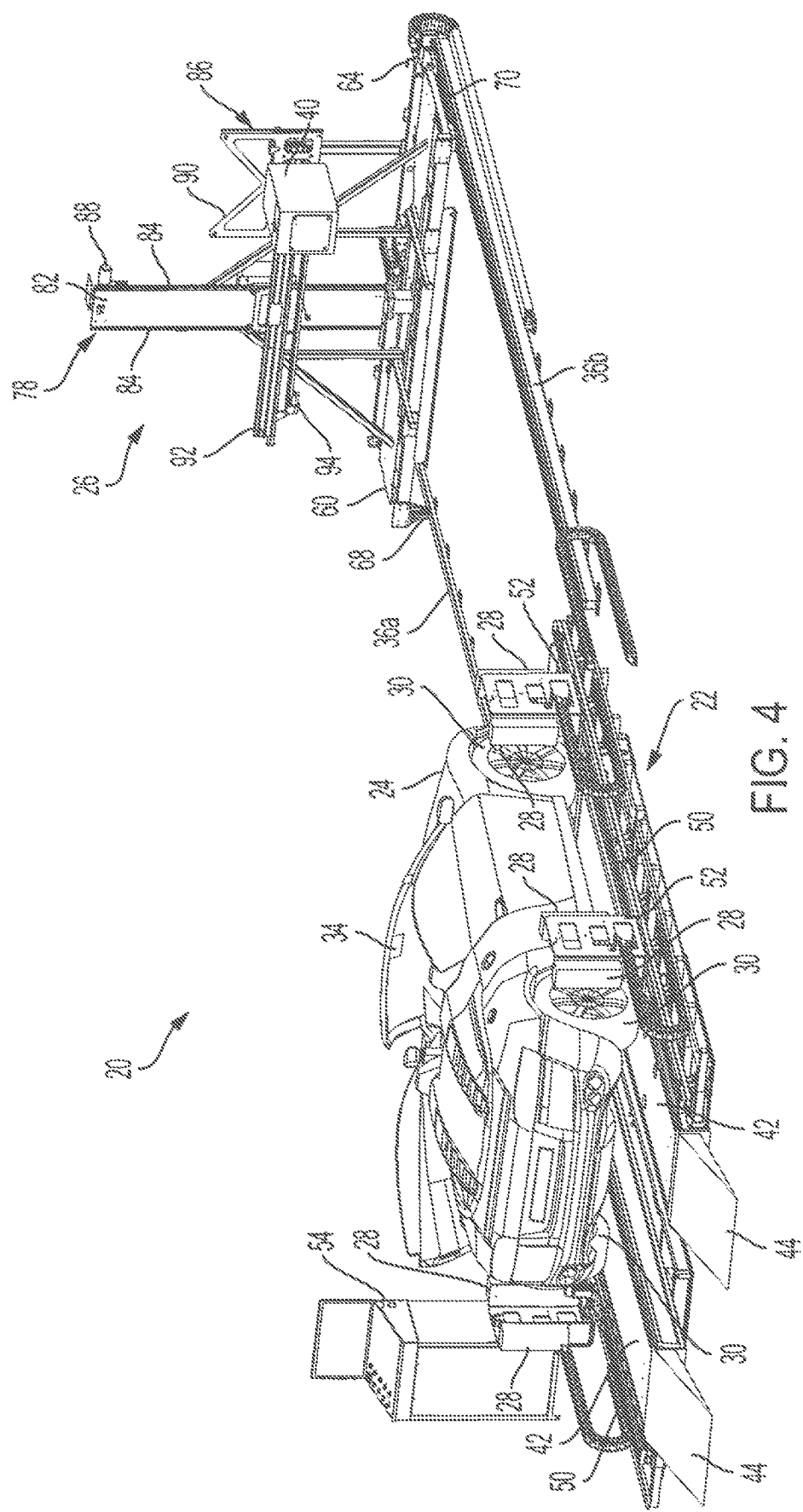
FIG. 4 is a perspective view of the system of FIG. 1 shown with the vehicle positioned on turning plates on the lift in a lowered position.

In the illustrated embodiment, the first positon of vehicle 24 on lift 22 is longitudinally behind turning plates 46 on runways 42, and the second position of vehicle 24 on lift 22 is longitudinally in front of turning plates 46, with the distance between the first and second positions resulting in approximately a one-half rotation or 180 degrees of rotation of the tire and wheel assemblies 30. Upon determining the wheel alignment in the first and second positions, vehicle 24 may then be put into a third or adjustment or alignment position in which the front or forward or steering tire and wheel assemblies 30 are disposed on the turning plates 46, as shown in FIG. 4. Correspondingly, the four sets of sensors 28 are again moved along rails 50 so as to be disposed adjacent to or aligned with each of the four tire and wheel assemblies 30 in the alignment position. The inclusion of float plates 46 upon which the steerable tire and wheel assemblies 30 of vehicle 24 are located, such as the front wheels of the vehicle 24 in the illustrated embodiment, conventionally allows the steerable tire and wheel assemblies 30 to be turned left and right, such as in performing a conventional sweep for measuring caster angle. In addition, a conventional steering wheel level (not shown) may be installed to vehicle 24, along with a conventional steering wheel retainer (not shown), so as to set and maintain a centered orientation for the steering wheel.

It should be appreciated that alternative arrangements and methods may be employed for determining alignment of vehicle 24 on lift 22, including depending on the size of a vehicle and/or the lift being used. For example, the second position may be on the float plates 46. Still further, the vehicle may be moved a known amount or, based on a known tire size, the amount of rotation of the tire and wheel assemblies 32 can be determined for the runout-compensation calculation. It should be appreciated that alternatively the orientation of the wheel assemblies 30 may be measured at a single position if runout-compensated values are not required, or may be measured at more than two positions.

Lift 22 may then be extended into a raised or elevated position or orientation, such as shown in FIG. 5, whereby operator 38 is readily able to access the underside of vehicle 24 between lift assemblies 48 so as to be able to adjust the alignment of the tire and wheel assemblies 30 as needed. This includes, for example, adjusting the toe and camber of the tire and wheel assemblies 30 on each side of vehicle 24, such as by adjusting tie rods. To this end, computers 54 and/or 56 may include a screen for displaying a graphical representation of the alignment parameters, such as toe and camber, during alignment adjustment, with sensors 28 providing continuous determinations during adjustment as feedback to the operator 38. Computers 54 and/or 56 may include an alignment program for graphically aiding operator 38 in the process of adjusting the alignment, as well as for recording the alignment results and final alignment settings.

The fender height or ride height of vehicle 24 may also be obtained using sensors 28, where height measurements may be used in determining the ADAS sensor heights on the vehicle. For example, the ADAS sensors being calibrated are disposed at a predetermined position on the vehicle relative to the vehicle assembly, such as relative to portions of the vehicle body and as established during assembly of the vehicle. By determining fender height, system 20 may then be able to determine the sensor height of the ADAS sensors based on the known location of the vehicle sensor on the vehicle 24, with that information in turn being used to position the target 32 relative to the vehicle sensor 34 being calibrated, as discussed in more detail below. The cameras of sensors 28 may be used to measure the fender height, such as via conventional object recognition operations. Based on a known orientation of sensors 28 relative to runways 42 and a determined change in projection pattern as the projected light impinges on portions of the body of vehicle 24, such as about the wheel well or adjacent thereto, where the fender height determination may additionally be based on known geometric characteristics of the vehicle make and model, such as the mounting of the body relative to the frame or suspension components as is conventionally known. Sensors 28 may additionally be adjustable vertically relative to runways 42, such as via an actuator to raise or lower sensors 28 to accommodate the measuring of differing fender heights. Alternatively, one or more separate cameras may be used to measure the fender height, such as a camera positioned at or adjacent each sensor 28. In embodiments employing a separate sensor for measuring fender height, such a sensor may be configured as a vertically adjustable camera, where the camera is mounted to a vertically oriented stand or tree and is movable along the stand such as via an actuator or the like.

The moveable or adjustable mounting of sensors 28 on lift 22 enables use of system 20 with vehicles of differing sizes, including both wheelbase length and width. For example, longitudinal adjustment of sensors 28 disposed by the rear wheel assemblies 30 enables use of system 20 with differing length vehicles when the front wheel assemblies 30 are positioned on the float plates 46.

Sensors 28 are thus operable to measure the alignment of wheel assemblies 30, and as noted are additionally operable for use in determining the orientation of vehicle 24 on lift 22, such as relative to runways 42, and including both laterally and longitudinally on runways 42, as well as vertically via the fender height determination. This includes, for example, determining the vertical center plane of the vehicle 24. For example, sensors 28 are disposed in a known geometric orientation relative to each other and about runways 42. Based on the determination of the orientation of each of the wheel assemblies 30 a controller of system 20, such as controller 54, is able to determine the vertical center plane of the vehicle 24, which is defined as a vertically oriented plane passing through the center of the vehicle 24. As discussed herein, once the vehicle's vertical center plane is determined, a lateral center point of a target 32 may be aligned coincident with the vehicle's ADAS sensors with respect to the vertical center plane. In particular, a controller, such as controller 54 or 56 as discussed below, issues control signals for controlling the driven motion of target adjustment frame 26 to which a target, such as target panel 32, may be mounted such that the target panel 32 is aligned to the relevant vehicle ADAS sensors. Thus, based on the determined positon of the vehicle 24 in a three-dimensional coordinate system on lift 22, and the known orientation of the target frame 26 to the lift 22, and in particular the base frame 60 to the lift 22, the target 32 can be positioned in the three dimensional coordinate system so to be in a predetermined orientation relative to the sensor 34 of vehicle 24. For example, the target 32 may be positioned relative to the vehicle 24 and sensor 30 longitudinally, laterally and rotationally about a vertical axis based on specifications for a calibration procedure, such as based on OEM calibration specifications.

One or more of the controllers 54 or 56 are additionally operable to provide instructions to operator 38, as well as position and operate sensors 28 to obtain the orientations of wheel assemblies 30 as well as the orientation of vehicle 24 on lift 22. Controllers 54 and/or 56 may have programs or stored in memory operational instructions for a given vehicle based on make and model, as well as based on equipped sensors, or may receive information via a remote computer, such as a remote server, via an Internet connection. In turn, based on the determined orientations and relative location of vehicle 24 on lift 22, as well as based on prescribed calibration procedures for the vehicle sensors 34, target frame 26 is positioned relative to vehicle 24 on lift 22 when lift 22 is in its lowered orientation whereby calibration of the sensors 34 on vehicle 24 may be performed, such as in accordance with OEM specifications.

Calibration of sensors 34 on vehicle 24 requires positioning of targets 32 relative to sensors 34 in order to perform a calibration operation, such as in accordance with OEM specifications. Accordingly, upon determining the orientation of vehicle 24 on lift 22, the position of target frame 26 may be adjusted, as discussed below.

As noted above and, for example, shown in FIG. 1, target adjustment frame 26 is positioned on rails 36a, 36b for longitudinal movement relative to lift 22 and vehicle 24, where frame 26 is in a known orientation relative to lift 22 whereby targets 32 may be positioned relative to vehicle 24, and thereby sensors 34, with vehicle 24 in a known, determined position on runways 42 of lift 22. In particular, base frame 60 of target frame 26 is in a known orientation relative to lift 22, whereby based on a determination of the orientation or position of vehicle 24 on lift 22, the orientation of vehicle 24 to target frame 26 is thus determined.

Figure 6:
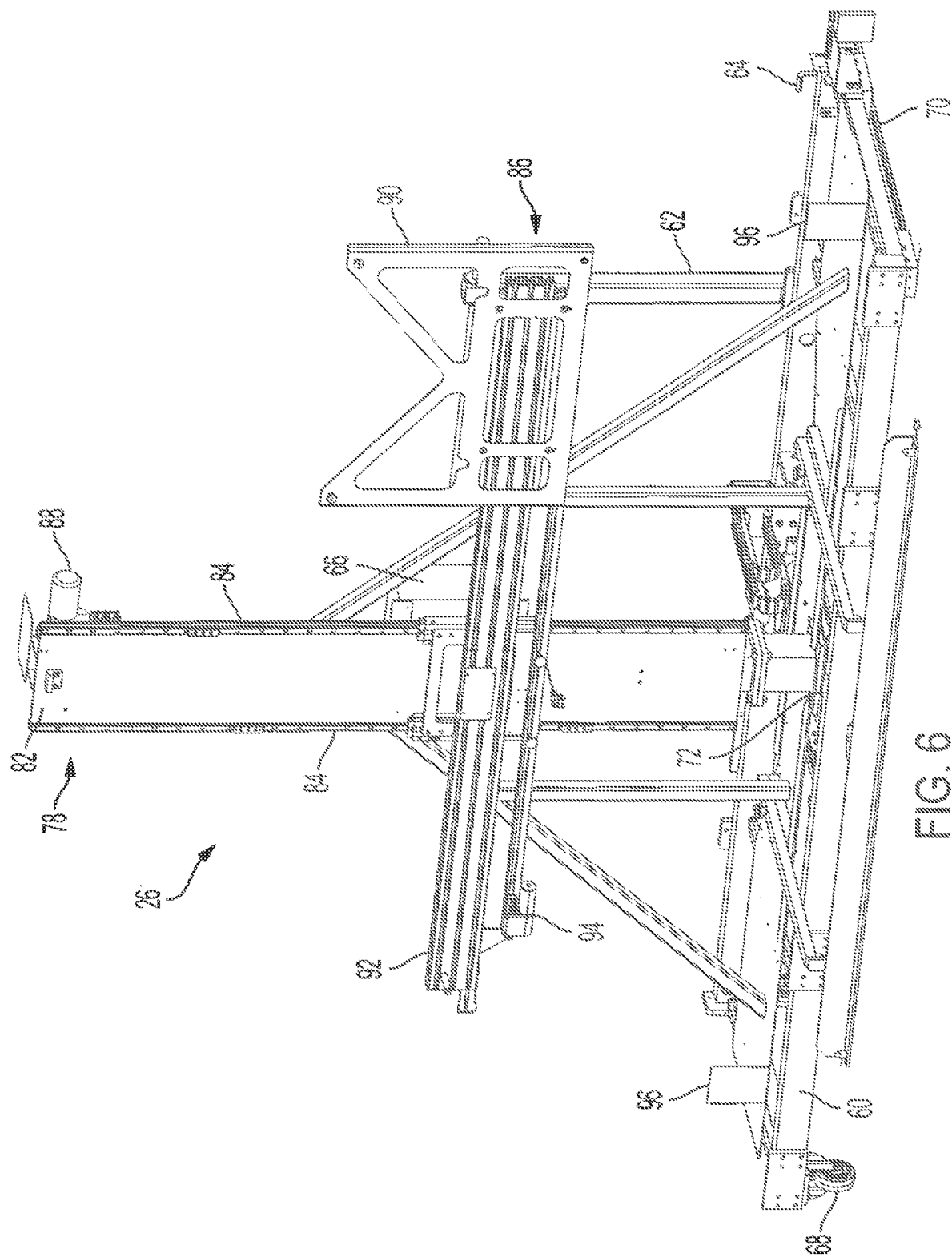
FIG. 6 is a front perspective view of a target adjustment frame or stand of the system of FIG. 1 in accordance with aspects of the present invention and shown separate from the system of FIG. 1.
Figure 7:
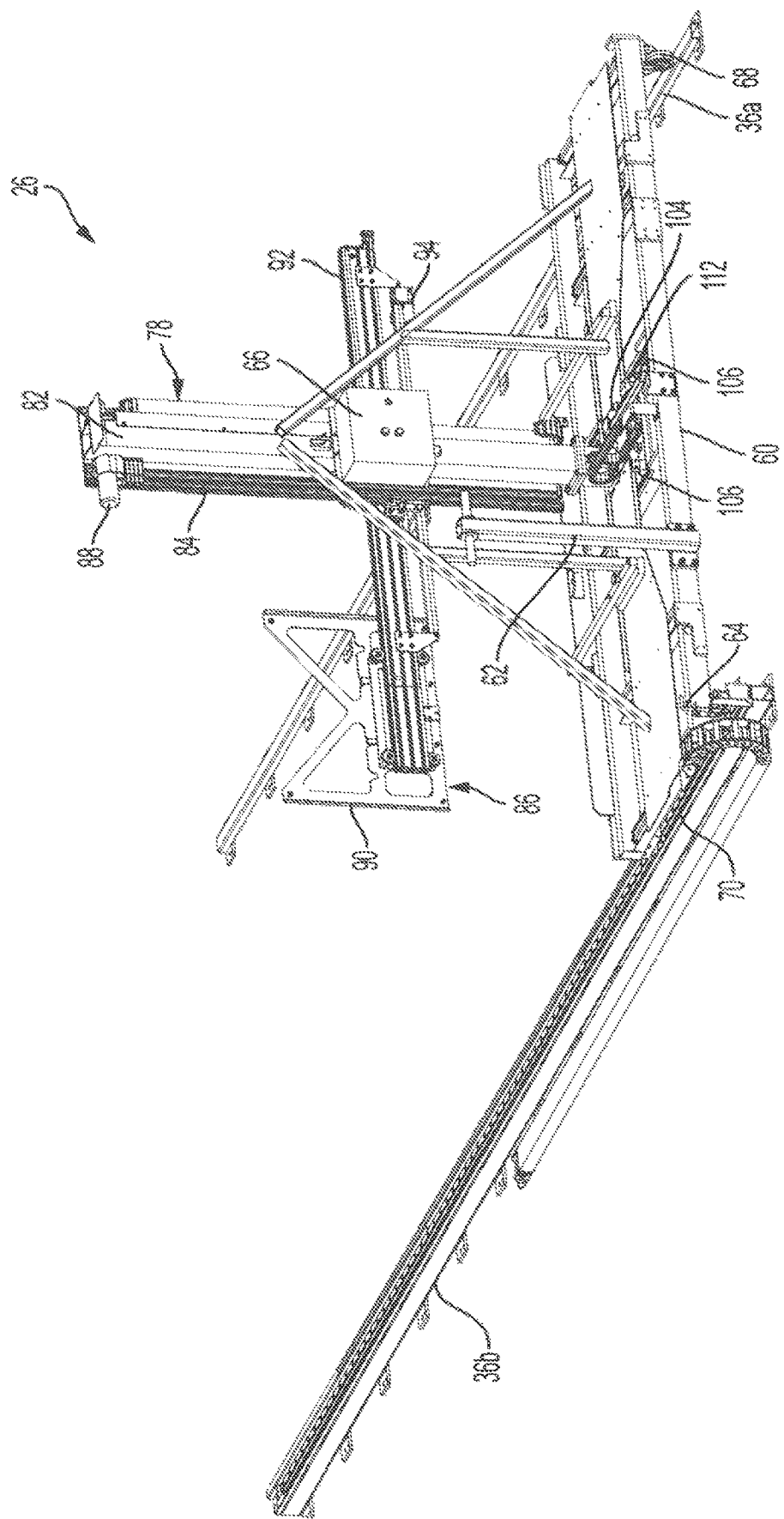
FIG. 7 is a rear perspective view of the target adjustment frame of FIG. 6.

A detailed description of target frame 26 will now be provided with reference to FIGS. 6 and 7, vehicle target frame 26 is adjustable longitudinally along rails 36a, 36b to obtain a first, initial or gross orientation of target frame 26, and hence a target 32 mounted thereto, relative to vehicle 24 on lift 22 when lift 22 is in the lowered orientation. In particular a base frame 60 of target frame 26 is mounted for movement along rails 36a, 36b. Target frame 26 may be both manually moveable along rails 36a, 36b via operator 38 pushing on handle 62, as well as automatically adjustable along rails 36a, 36b, such as via a one or more rail actuators, chain drive, pulley system or the like. Target frame 26 may additionally be secured to rails 36a, 36b, such as by a manual lock 64, so as to retain base frame 60 in a rough initial position, such as upon manual movement by operator 38 based on directions provided via controller 54 and/or 56.

As discussed in more detail below, in order to precisely position a target 32, target frame 26 is additionally moveable longitudinally in a more precise or fine orientation, as well as laterally with respect to the vehicle 24, and vertically, as well as rotationally about the vertical axis. In the illustrated embodiment target frame 26 is substantially similar to the target frame disclosed in co-pending U.S. patent application Ser. No. 16/398,404, U.S. Pub. No. 2019/0331482A1, which is incorporated herein by reference in its entirety, including with respect to the construction, operation and use of the target frame, but with a difference being the omission of imager housings disclosed in U.S. patent application Ser. No. 16/398,404.

As previously noted target adjustment frame 26 movably supports target 32 and includes controller 66. In the illustrated embodiment, base frame 60 of target adjustment frame 26 is generally rectangular with various frame members and includes wheels 68 for riding on rail 36a and includes a linear slide 70 for riding on rail 36b, with wheels 68 and slide 70 mounted to frame 60. Alternatively, however, base frame 60 need not include wheels 68 and/or slide 70 such as, for example, in embodiments in which base frame 60 is movable along rails 36a, 36b by a rail actuator. Rails 36a, 36b may be set during installation or adjustable to be level, and/or the sliding connection of base frame 60 with rails 36a, 36b may be adjustable for controlling of level movement, with rails 36a, 36b being in a fixed arrangement relative to lift 22 such that the orientation or position of base frame 60 relative to lift 22 is known.

Target adjustment frame 24 further includes a base member 72 that is moveable forwards and backwards via an actuator 74 along an X-axis, where base member 72 is mounted for sliding movement in rails 76 of base frame 60 and the X-axis is thus parallel to rails 76 for movement longitudinally relative to vehicle 24 when in the orientation of FIG. 2. A tower assembly 78 is rotatably mounted to base member 72 via a bearing (not shown). The pivoting or rotatable mounting on base member 72 enables tower assembly 78 to be rotated about the vertical or Z-axis by way of actuator 80, as well as translated or moved longitudinally by actuator 74 via movement of base member 72.

Tower assembly 78 in turn includes an upright frame member configured as a vertically oriented tower 82 with vertically oriented rails 84, with a target support assembly 86 being mounted to rails 84 whereby the assembly 86 is moveable up and down in the vertical or Z-axis, where assembly 86 is moveable by way of actuator 88. Target support assembly 86 is mounted to rails 84 for vertical movement, with a target mount 90 in turn being mounted to horizontal rail 92. Target mount 90 is configured to hold target 32 and is horizontally moveable along rail 92 by way of actuator 94, with target mount 90 including various pegs and/or cutouts for supporting targets when targets are selectively removabley hung on or attached to mount 90.

Actuators 74, 80, 88 and 94 are operably connected, such as by control wires, with controller 66 whereby controller 66 is able to selectively activate the actuators to move their associated components of target adjustment frame 26. In addition, as noted above, one or more rail actuators may be employed to move the entirety of target adjustment frame 26 along rails 36a, 36b by translating movement of base frame 60 on rails 36a, 36b. It should be appreciated that various constructions or types of actuators may be used, including for actuators 174, 80, 88 and 94 for movement of the various components of target adjustment frame 26, as well as for rail actuators used to translate base frame 60 on rails 36a, 36b. In the illustrated embodiment, actuators 74, 80, 88 and 94 are constructed as electrical linear actuators. Alternatively, however, the actuators may be constructed as geared tracks, adjustment screws, hydraulic or pneumatic piston actuators, or the like. Still further, it should be appreciated that alternative arrangements of target adjustment frame and actuators may be employed for positioning of a target within the scope of the present invention. For example, base member 72 may be configured for lateral movement relative to base frame 60 and/or tower 78 may be configured for lateral movement relative to base member 72. Moreover, to the extent base frame 60 may be sufficiently precisely positioned longitudinally along rails 36*a*, 36*b* with rail actuators, system 20 may need not include actuator 72 for providing fine adjustment of the lateral position of base member 72 along rails 76.

System 20 may additionally include distance sensors, such as time-of-flight sensors, for monitoring and/or controlling the distance of target frame 26 to lift 22. In the illustrated embodiment, laterally separated plates 96 (FIG. 6) may be provided on base frame 60 for use with distance sensors 98 (FIG. 13) configured as time-of-flight ("ToF") sensors on lift 22, where in particular plates 96 are mounted to panels that rotate about the vertical axis with tower 82. As such, accurate distance information between lift 22 and target frame 26, and thereby vehicle 24 and its sensors 34 relative to a target 32 may be determined. The distance information may be used as a feedback loop in setting the target position relative to the vehicle.

Figure 8:
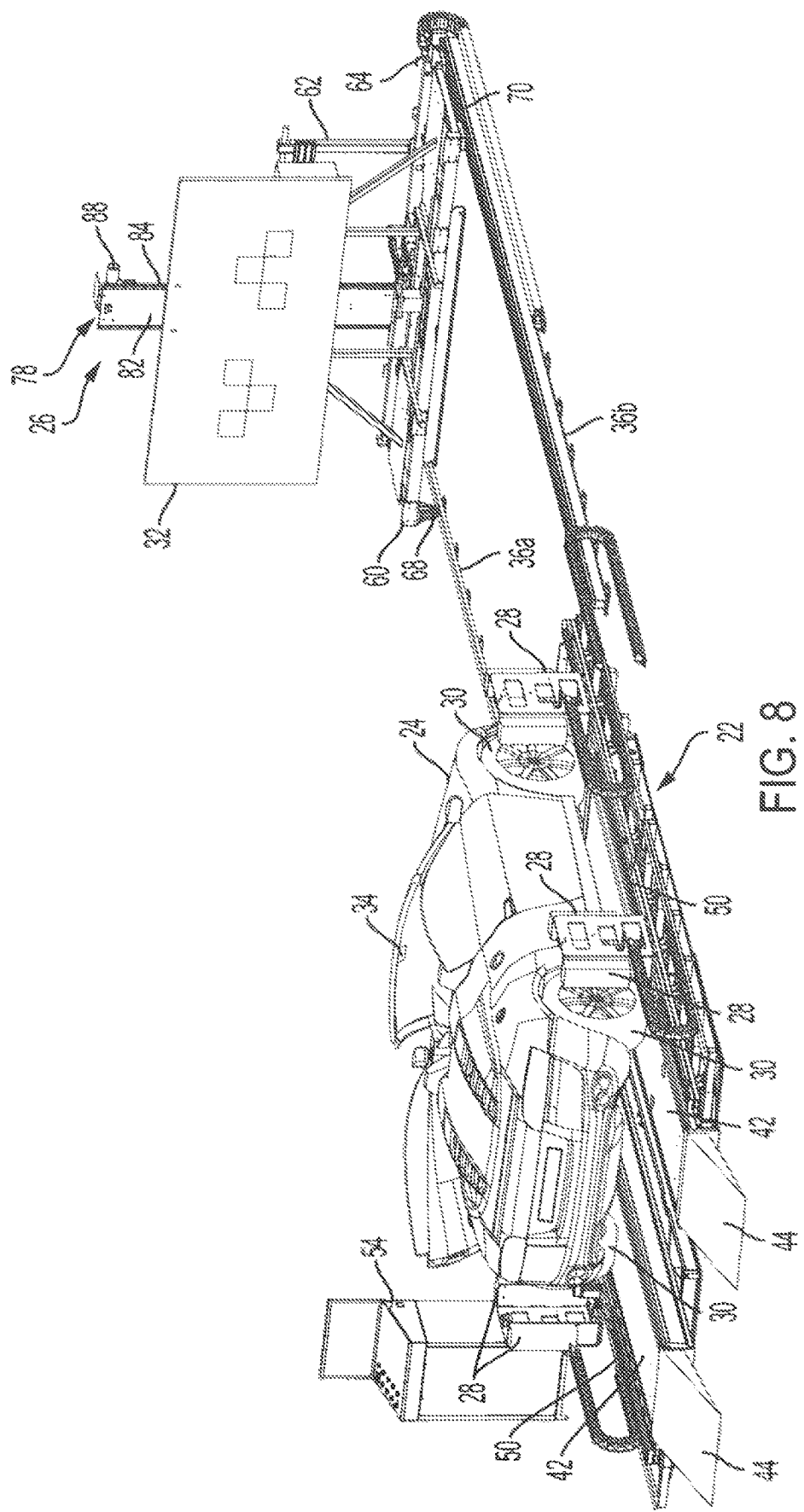
FIGS. 8 and 9 are perspective views of the system of FIG. 1 with the target adjustment frame shown in a first position and a second position relative to a vehicle and with a calibration target mounted thereto.

The operation of orienting a target 32 relative to the vehicle sensor 34 will now be further discussed with reference to FIGS. 8 and 9. Upon determination of the position of vehicle 24 on lift 22 via non-contact wheel alignment sensors 28, and upon system 20 obtaining vehicle information, such as by way of controller 54 and/or 56 via an OBD port of vehicle 24, either or both of controllers 54 or 56 may provide instructions to operator 38 as to what specific target 32 to mount to target mount 90 for a given vehicle sensor 34 that is to be calibrated. Each target 32 may be provided with a radio-frequency identification ("RFID") tag and the operating program of system 20 may require confirmation that a correct target is selected. For example, operator 38 may use controller 56, or a handheld scanner or the like that is interfaced with controller 54 and/or 56, to scan the target 32 to confirm selection of the correct target 32 for calibration of a particular sensor 34 of vehicle 24. As understood from FIG. 8, operator 38 then hangs target 32 on target mount 90 with target frame 26 in an initial position.

Figure 9:
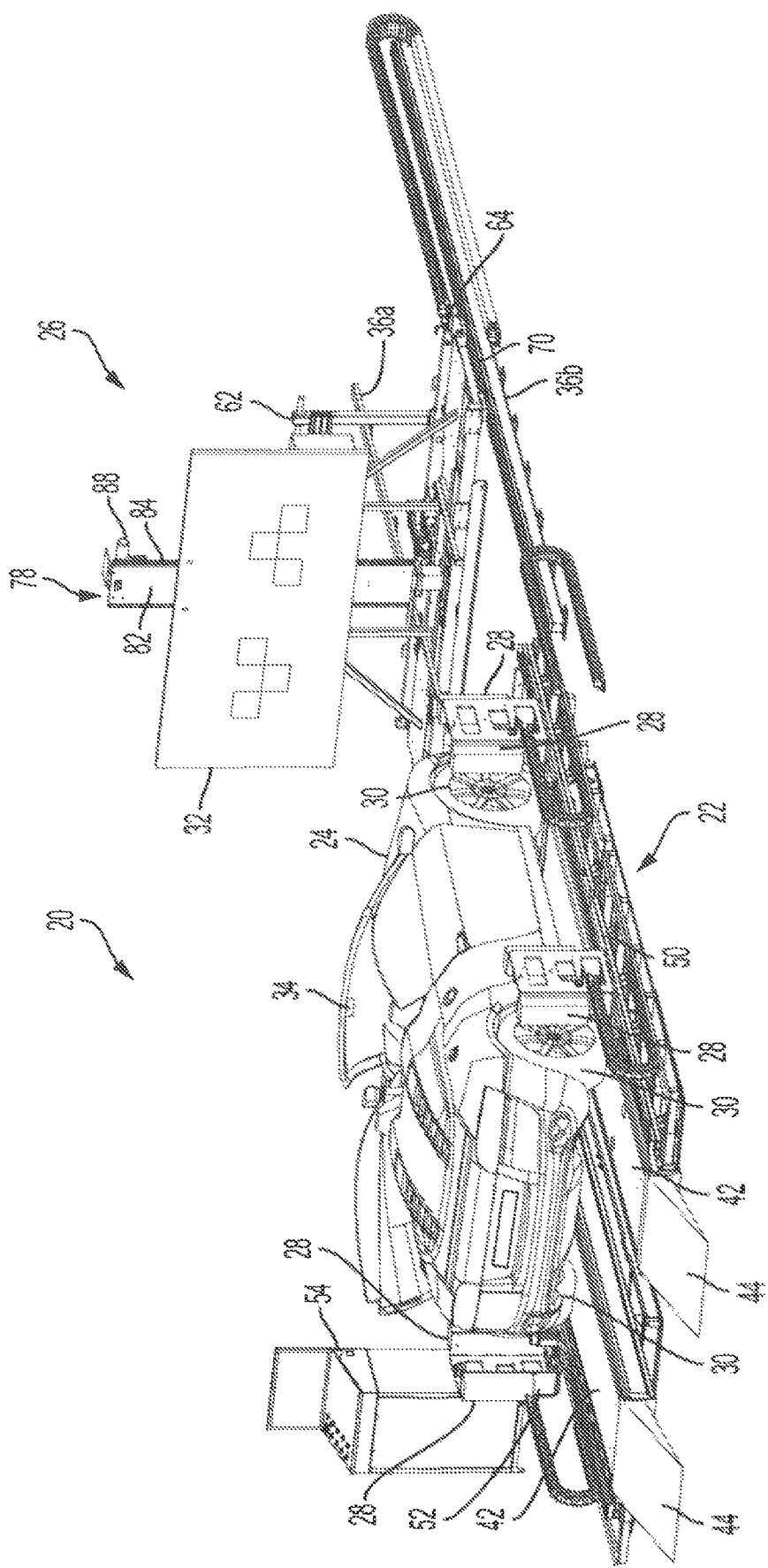

System 20 may then provide instructions to operator 38 to position the target frame 26 into a rough orientation relative to lift 22, such as shown in FIG. 9. For example, either or both of controllers 54 or 56 may provide instructions to operator 38 to manually move target frame 26 along rails 36*a*, 36*b* via handle 62 and to then fix target frame 26 into position via lock 64. This positioning may be confirmed via distance sensors 98. Either or both of controllers 54 or 56 may then provide signals to controller 66 for precisely adjusting the target 32 via actuators 74, 80, 88 and 94 so as to orient the target 32 relative to the sensor 34 based on the predetermined orientation or position of vehicle 24 on lift 22 as determined via sensors 28, including based on the known and defined orientation of lift 22 to target frame 26, and the defined position of target 32 for the position of the ADAS sensor 34 on vehicle 24, such as based on OEM calibration procedures. Alternatively, controller 54 may transmit wheel alignment and vehicle orientation information to a remote computer, such as to a remote server via an Internet connection, along with vehicle information regarding the vehicle under test, with the remote computer in turn transmitting position information instructions to controller 66 to position target 32 via actuators 74, 80, 88 and 94, and including actuators for moving target frame 26 along rails 36*a*, 36*b*. Upon accurately positioning target 32 taking into account the orientation of vehicle 24, a calibration procedure or program may be initiated and run. For example, via the connection with the diagnostic port of vehicle 24, one or more vehicle computers may be initiated to perform a calibration routine that is set and supplied by the OEM whereby the sensor becomes calibrated for use with the vehicle 24.

Figure 10:
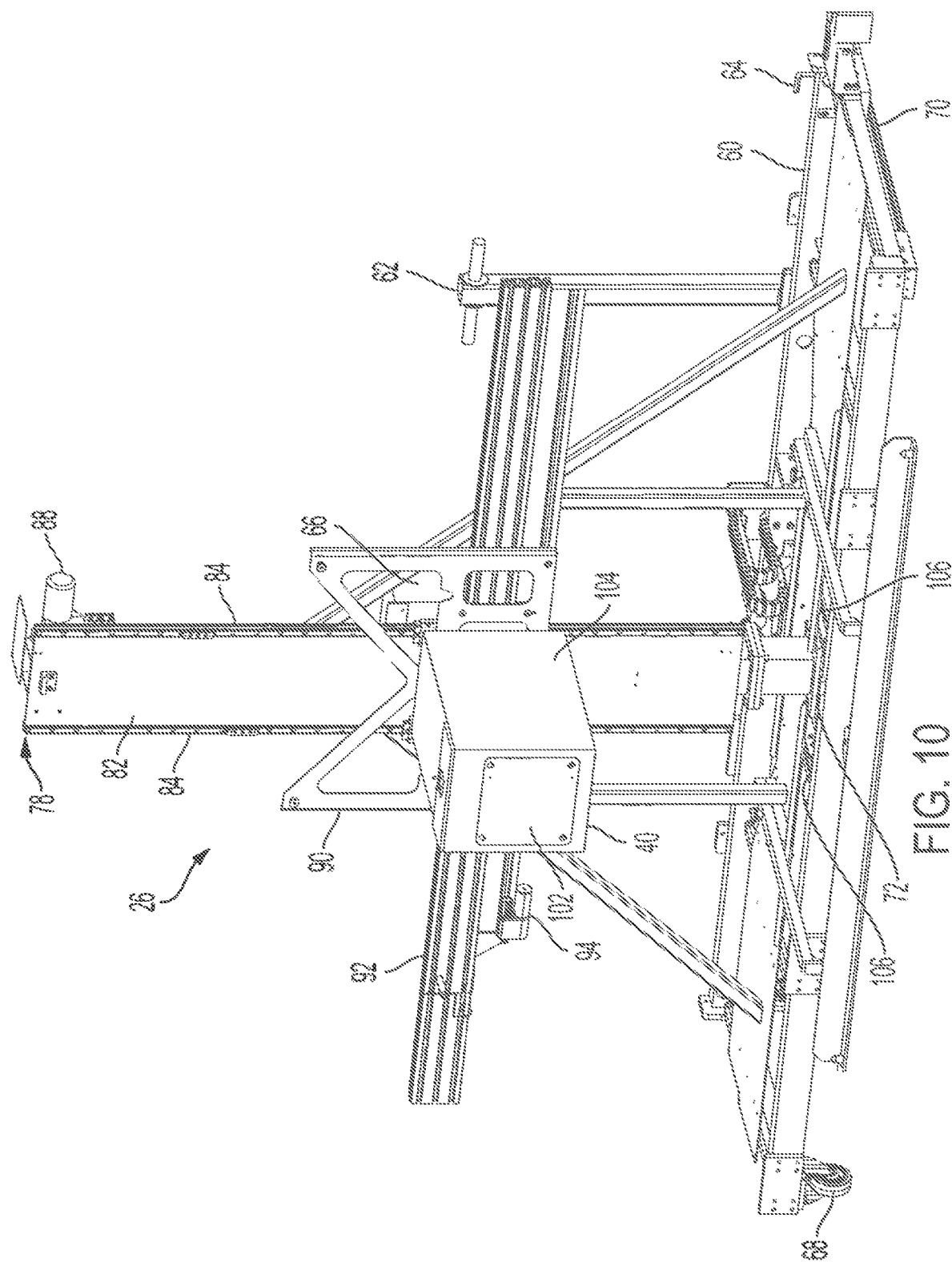
FIG. 10 is a perspective view of the target adjustment frame of FIG. 6 shown with a headlight aimer sensor mounted thereto.
Figure 11:
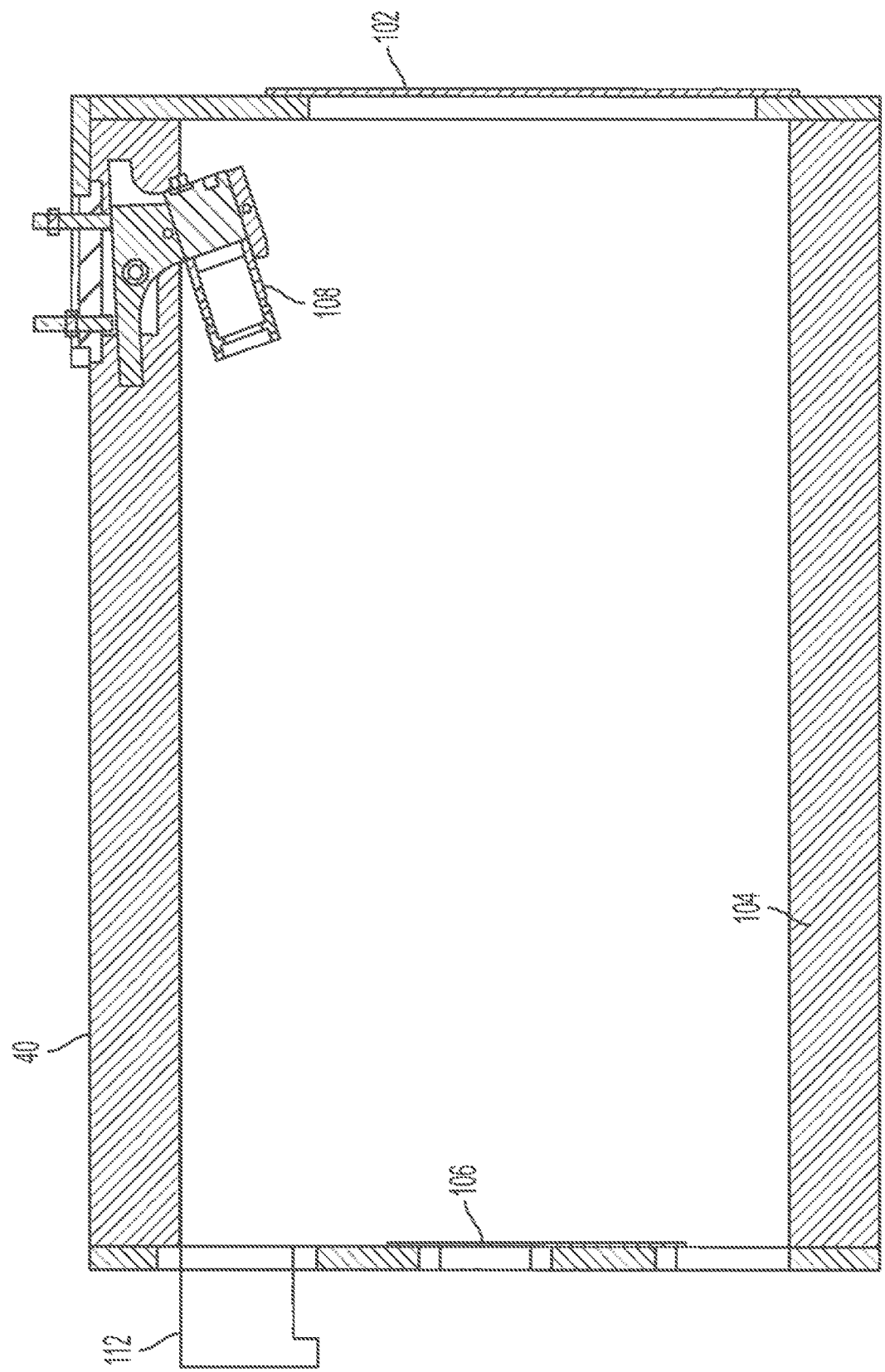
FIG. 11 is a side cross sectional view of the headlight aimer sensor of FIG. 10.
Figure 12:
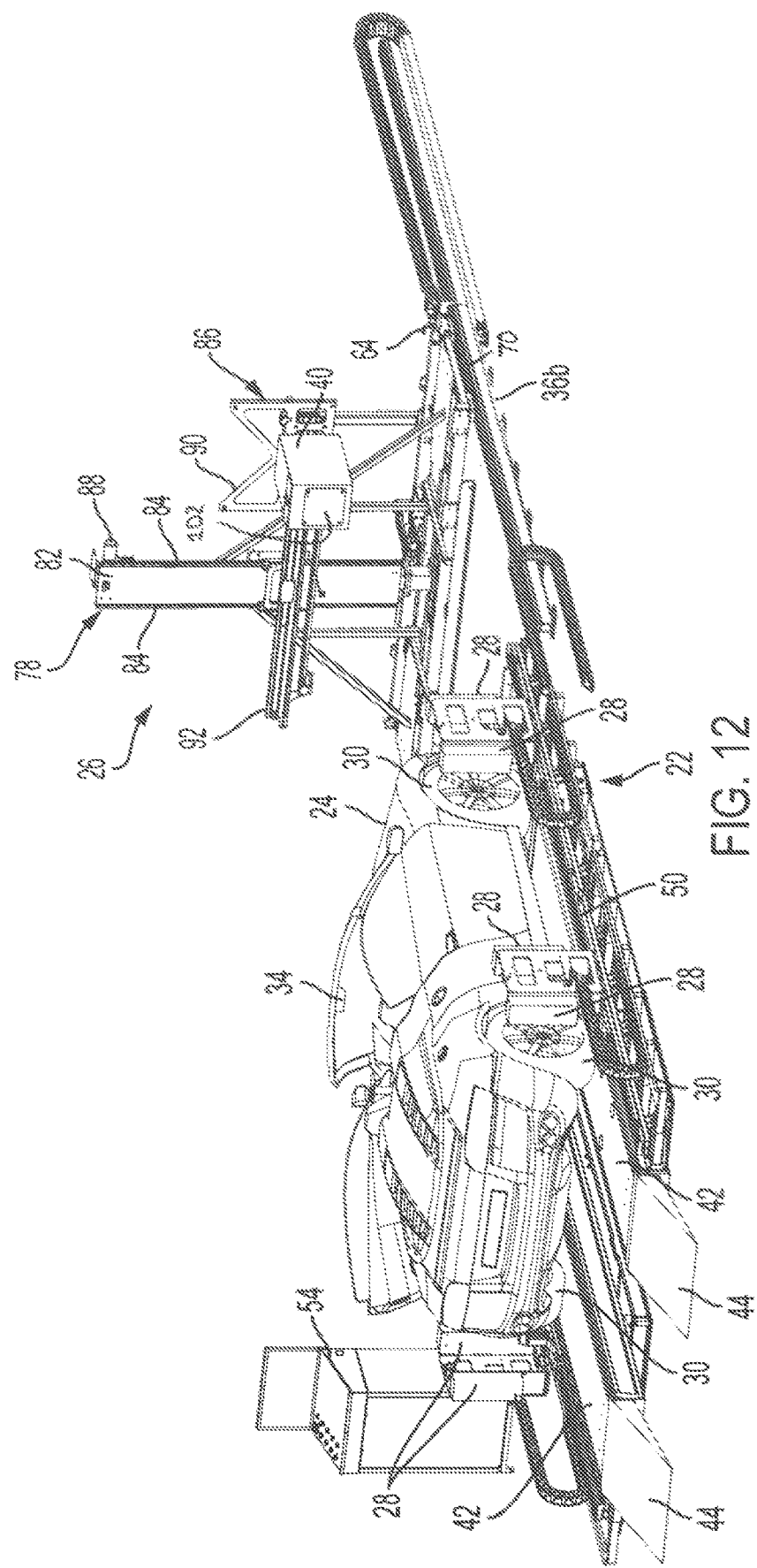
FIG. 12 is a perspective view of the system of FIG. 1 shown with the headlight aimer sensor mounted to the target adjustment frame relative to a vehicle.

In addition to use for calibrating sensors 34 and adjusting the alignment of vehicle 24, system 20 is also operable for use in checking and adjusting the orientation of projecting lights on vehicle 24, such as headlights 114, running lights and/or fog lights, and the like, which operation is discussed with reference to FIGS. 10-12. As there shown, a light or headlight aimer sensor 40 is mounted to target frame 26, and in particular shown mounted to target mount 90. Headlight aimer sensor 40 may be used in connection with system 20 for use in the alignment of lights of vehicle 24 when vehicle 24 is on lift 22, such as headlights, fog lights and the like. In the illustrated embodiment headlight aimer sensor 40 includes a Fresnel lens 102 mounted at the front of housing 104 with an internal imaging plate or projection surface 106 disposed at the back of housing 104, along with an internal digital imager or camera 108. Camera 108 is connectable via a wire or cable to controller 66 or controllers 54 and/or 56 whereby images obtained by camera 108 may be projected for viewing, such as by operator 38 on a monitor associated with controller 54 or 56. In the illustrated embodiment cable 110 is configured as a power over Ethernet cable. Housing 104 further includes rear mounting brackets, with spaced apart mounting pegs or pins 112 that are used to supportively hang sensor 40 to target mount 90, such as within correspondingly spaced detents on target mount 90. Headlight aimer sensor 40 may further include a handle on top of housing 104 to aid in carrying sensor 40, as well as in hanging and removing sensor 40 to and from target mount 90.

In operation, as noted, the specifics of vehicle 24 are obtained, such as by reading out of the on board diagnostic port of vehicle 24, such as to obtain the make, model and year of vehicle 24, which may as well include obtaining information regarding additional details regarding vehicle 24, such as configuration information regarding vehicle 24 as to lights on vehicle 24 in addition to specifics of ADAS sensors. Alternatively, an operator 38 may enter information regarding vehicle 24 into system 20, such as into computer 54 and/or 56. With system 20 knowing the orientation of vehicle 24 on vehicle lift 22 based on the determination of non-contact wheel alignment sensors 28, as discussed above, and with system 20 knowing the make and model of vehicle 24, target frame 26 is able to selectively position headlight aimer sensor 40 directly in front of lights of vehicle 24 for alignment purposes, such as in front of each of the headlights 114 of vehicle 24 with lift 22 in the lowered orientation for determining the projection orientation of the headlight 114 and adjusting as necessary, such as in the case of a vehicle 24 that has been in a collision where the headlights have been replaced. In particular, target frame 26 may be initially longitudinally moved along rails 36*a*, 36*b* so as to move headlight aimer sensor 40 to be in an approximate longitudinal distance from the headlights 114 of vehicle 24, such as by manually moving target frame 26 along rails 36*a*, 36*b* and then locking base frame 60 relative to rails 36*a*, 36*b*.

Target frame 26 may then automatically accurately position headlight aimer sensor 40 by way of actuators 74, 80, 88 and 94.

With a headlight 114 of vehicle 24 projecting through Fresnel lens 102, camera 108 detects the image projected onto projection surface 106, with the camera image in turn being displayed to operator 38 on a monitor. The displayed image may include a grid for measuring the height and/or side position of the headlight 114 relative to the vehicle 24 for aiding the operator 38 to accurately and correctly adjust the physical orientation of the headlight 114 of the vehicle 24 both with regard to the proper height and horizontal or side projection orientation. Upon completion of adjusting the headlight 114 on one side of vehicle 24, target frame 26 may automatically position headlight aimer sensor 114 in front of the opposite side headlight 114 of vehicle 24 for subsequent adjustment of that headlight.

Although shown in connection with the illustrated embodiment of system 20 employing non-contact alignment sensors 28 and a vehicle lift 22, it should be appreciated that headlight aimer sensor 40 may be utilized with alternative systems employing target frame 26. For example, headlight aimer sensor 40 may be used with the system described and disclosed in U.S. Pub. App. No. 2019/0331482A1 of application Ser. No. 16/398,404, which is incorporated herein by reference in its entirety. Still further, it should be additionally appreciated that headlight aimer sensor 40 may be used with yet further embodiments and configurations of target frame 26, which is configured to moveably position targets, such as headlight aimer sensor 40, into a desired orientation relative to a vehicle 24.

Still further, in like manner to the process of sensor 34 alignment with target 32 discussed above, operator 38 may receive instructions from controller 54 and/or 56, as well as provide input signals to system 20 via controller 54 and/or 56, such as to confirm that the target frame 26 has been oriented into an initial position and to initiate precise positioning of a target, such as a target 32 or target 40, via controller 66 of target frame 26 by actuators 74, 80, 88 and 94. Still further, remote processing may be employed via a remote computer, such as a remote server connected via the Internet.

As understood from the illustrated embodiment, flexible power and communication connections are provided with respect to sensors 28 on lift 22, for both movement of sensors 28 on rails 50 as well as for raising and lowering of lift 22, and as well as for movement of target frame 26 along rails 36*a*, 36*b*.

Figure 13:
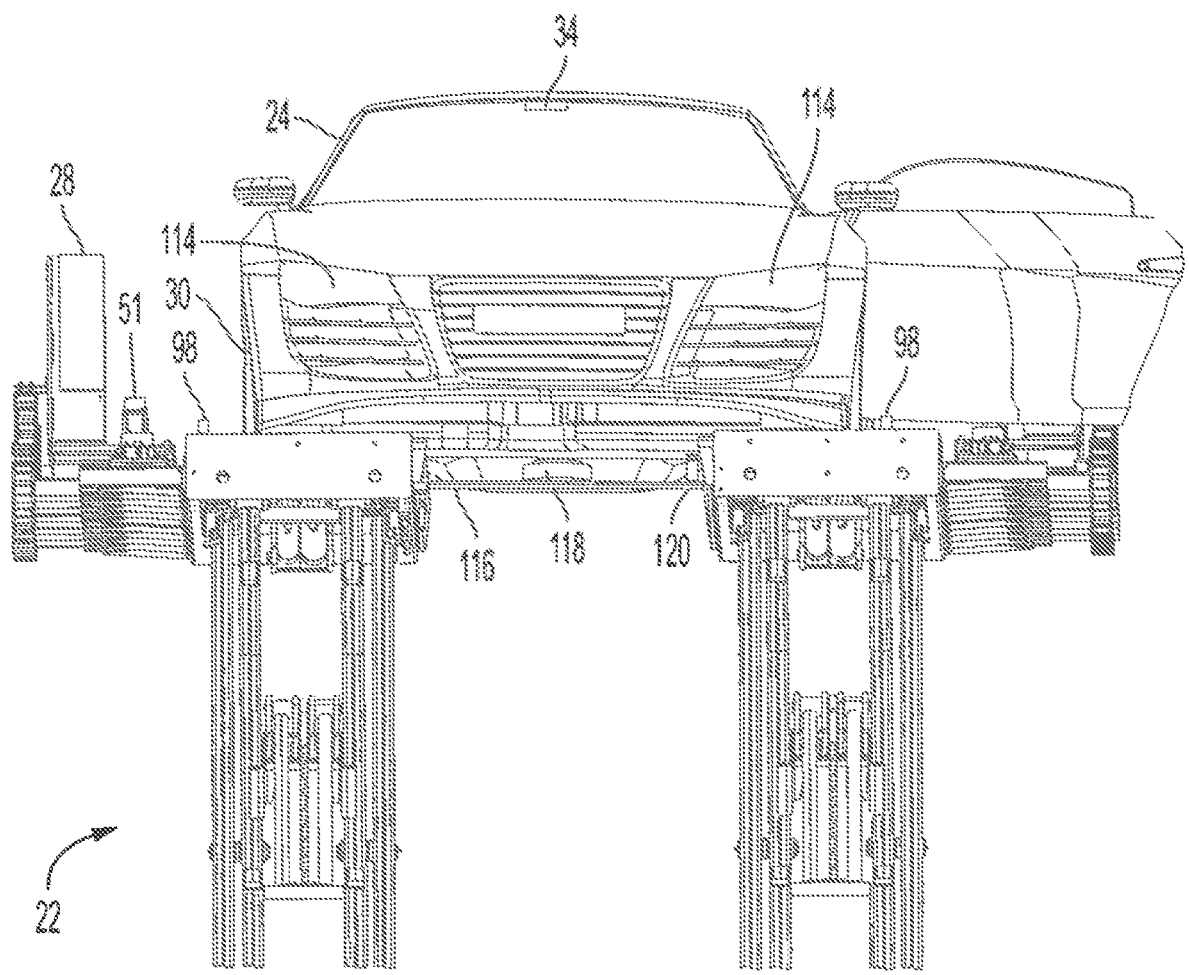
FIG. 13 is a front perspective view of the system of FIG. 1 shown with the lift in an elevated position and a vehicle level measuring sensor disposed beneath the vehicle.

In addition to checking and setting the alignment of vehicle 24, calibrating ADAS sensors 34, and checking and adjusting the orientation of the projecting lights of vehicle 24, system 20 is additionally operable for use in checking the orientation of the frame components of vehicle 24. For example, as understood from FIG. 13, a laser mapping system may be employed, such as supplied by Chief Automotive Technologies of Madison, Ind. As shown, a cross bar 116 is installed so as to extend between the two runways 42, with the cross bar 116 supporting a laser scanner 118. Various targets, such as target 120 shown in FIG. 13, are additionally hung from structural components of vehicle 24, such as frame components disposed about the vehicle 24. Laser scanner 118 is then used to map the vertical orientation of the structural components on the underside of vehicle 24, such as to determine if any frame straightening operations are required, or if such operations were successfully performed. In the illustrated embodiment a MERIDIAN LIVE MAPPING system with GALILEO scanner supplied by Chief Automotive Technologies is employed. It should be appreciated, however, that alternative such systems may be utilized. Still further, the ride height of vehicle 22 may be determined based on the use of other sensors, such as a laser mapping system supplied by Chief Automotive Technologies.

Controller 54 may additionally be used for storing the records of calibration and alignment results, including for ADAS sensors 34 and headlight aiming determinations, as well as wheel and tire assembly 30 alignment and frame alignment measuring. Such records may be kept, such as by VIN number, as confirmation of accurate settings. Still further, controllers 54 and/or 56 may be used by operator 38 for controlling setup, entering data regarding vehicle 24, initiating calibration procedures, initiating system 20 to provide signals to controller 66 for precise positioning of target mount 90, raising and lowering lift 22, and the like, as well as to control positioning of sensors 28 along rails 50 and positioning of target frame 26 along rails 36*a*, 36*b*. And as noted, system 20 may provide instructions to operator 38 via controllers 54 and/or 56.

In accordance with a further aspect of the present invention a computer system comprising computers 54, 56 and controller 66 is operable to determine the orientation of the vehicle 24 based on information from sensors 28, and to selectively actuate the actuators of target frame 26 to position the target mount 90. The computer system may further include or comprise a remote computer, such as a remote server, accessible via an Internet connection.

It should be appreciated that the orientation of lift 22 relative to target frame 26 is important to the accurate positioning of a target 32 relative to ADAS sensors 34 on vehicle 24 when vehicle 24 is disposed on runways 42 of lift 22. Sensors 28 therefore may be calibrated such that their position relative to lift 22 is known, including for example such as relative to runways 42. Accordingly, one or more calibration gauges may be employed to calibrate the orientation of the sensors 28 relative to the lift 22, such as calibrating the coordinate system of the sensors 28 to the runways 42. For example, one or more calibration gauges having a known geometry may be secured to runways 42 in a known orientation on runways 42. Sensors 28 may then be activated in a calibration procedure whereby the spatial orientation of the gauges is detected and subsequently used for determining the orientation of a vehicle 24 on runways 42 based on the measured orientation of the wheel assemblies 30. Such calibration gauges may be sized to provide a surface upon which the light patterns projected by sensors 28 may be projected, where the surface is of a known configuration, such as flat, and as noted with the gauges in a known orientation on runways 42, such as square to runways 42 at a known depth from an edge of runways 42. Separate such gauges may be positioned in front of each pair of sensors 28 simultaneously, or a single such gauge may be employed that is selectively located in front of each sensor 28. Still further, alternative means of calibrating sensors 28, including relative to lift 22 may be employed.

It should further be appreciated that alternative arrangements and configurations of system 20 may be employed within the scope of the present invention. For example, although shown in the illustrated embodiment as having each sensor 28 movably mounted via rails 50, it should be appreciated that alternative structure and arrangements may be used to provide for adjustment of positioning of sensors 28 on lift 22. Still further, although disclosed as having lateral adjustment capability of sensors 28, system 20 may alternatively not require lateral adjustment of sensors 28.

For example, if sensors 28 have sufficient depth of field to measure the orientation of the tire and wheel assemblies 30 as desired then lateral adjustment may not be required. Additionally, although target frame 26 is shown supporting targets, such as target panel 32 and headlight aiming sensor 40 on target mount 90, alternatively located and configured targets may be supported by target frame 26. For example, targets may be affixed to a front framework of target frame 26 for positioning a horizontally disposed mat target along the floor surface.

In a further embodiment a system in accordance with the present invention may not include or employ a lift for the vehicle. In such an arrangement the non-contact wheel alignment sensors may still be employed to obtain the wheel assembly orientations as well as the vehicle orientation, with such information being used to accurately position target frame 24 and a target mounted thereto relative to the ADAS sensors of the vehicle. In such a configuration an operator 38 would not be able to adjust the alignment of the wheel assemblies 30 from underneath the vehicle 24 while standing at the same level as the target frame 26. Such an arrangement could, however, be used in the case of a facility in which a pit is provided whereby an operator 38 could adjust the alignment of the wheel assemblies while positioned in the pit.

In addition, an operator 38 may perform various steps and checks in different orders than as discussed herein, such as checking headlight aim orientation prior to calibration of ADAS sensors.

Still other changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A system for aligning a target to a vehicle for calibration of a sensor equipped on the vehicle, said system comprising:
    a plurality of non-contact wheel alignment sensors configured for use in determining the orientation of tire and wheel assemblies of a vehicle, wherein each said non-contact wheel sensor is disposed laterally relative to the vehicle and is configured to project a light pattern onto a selected tire and wheel assembly and receive reflected images therefrom for determining the orientation of tire and wheel assemblies of the vehicle;
    a target adjustment frame configured to be disposed longitudinally relative to the vehicle and comprising a base frame, a target mount moveably mounted on said base frame with said target mount configured to support a target, said target adjustment frame further including a plurality of actuators configured to selectively move said target mount relative to said base frame, wherein said non-contact wheel alignment sensors are separate from said target adjustment frame and wherein said base frame is in a known orientation relative to said non-contact wheel alignment sensors;
    a computer system, said computer system configured to selectively actuate said actuators to position said target relative to the vehicle, with said target mount being moveable by said actuators about a plurality of axes;
    wherein said computer system is configured to determine the orientation of the vehicle relative to said target adjustment frame based on the orientation of the tire and wheel assemblies of the vehicle and to actuate said actuators responsive to the determination of the orientation of the vehicle to position said target relative to a sensor of the vehicle whereby the sensor is able to be calibrated using the target.

2. The system of claim 1, further comprising a vehicle lift and wherein said non-contact wheel alignment sensors are mounted to said vehicle lift.

3. The system of claim 2, wherein said non-contact wheel alignment sensors comprise non-contact wheel alignment sensors for use in determining the orientation of each tire and wheel assembly of the vehicle.

4. The system of claim 2, wherein said non-contact wheel alignment sensors are movable laterally and/or longitudinally relative to the vehicle.

5. The system of claim 1, wherein said computer system comprises at least one controller local to said non-contact wheel alignment sensors and/or to said target frame.

6. The system of claim 5, wherein said computer system includes a remote computer accessible by said controller via an Internet.

7. The system of claim 1, wherein said base frame of said target adjustment frame is longitudinally moveable relative to said non-contact wheel alignment sensors.

8. The system of claim 7, wherein said base frame is longitudinally moveable upon at least one rail.

9. The system of claim 1, wherein said actuators are operable to move said target mount longitudinally and laterally with respect to a longitudinal axis of the vehicle when positioned in front of said target adjustment frame, vertically, and rotationally about a vertical axis.

10. The system of claim 1, wherein said target is removable from said target mount, and wherein said system further includes a headlight aimer sensor, wherein said headlight aimer sensor is selectively mountable to said target mount, and wherein said computer system is configured to actuate said actuators responsive to the determination of the orientation of the vehicle relative to said target adjustment frame to position said headlight aimer sensor relative to a light projector of the vehicle whereby the orientation of the light projector of the vehicle is able to be determined using said headlight aimer sensor.

11. The system of claim 10, wherein said headlight aimer sensor includes a housing, a lens, an imaging surface and an imager, and wherein light projected by the light projector of the vehicle enters said housing through said lens and is projected upon said imaging surface inside said housing, and wherein said imager is operable to image the light projected on the imaging surface.

12. A system for aligning a target to a vehicle for calibration of a sensor equipped on the vehicle, said system comprising:
    a vehicle lift;
    a plurality of non-contact wheel alignment sensors mounted to said vehicle lift and configured for use in determining the orientation of tire and wheel assemblies of a vehicle positioned on said vehicle lift, wherein each said non-contact wheel sensor is disposed laterally relative to the vehicle and is configured to project a light pattern onto a selected tire and wheel assembly and receive reflected images therefrom for determining the orientation of tire and wheel assemblies of the vehicle;
    a target adjustment frame configured to be disposed longitudinally relative to the vehicle and comprising a base frame, a target mount moveably mounted on said base frame with said target mount configured to support a target, said target adjustment frame further including a plurality of actuators configured to selectively move said target mount relative to said base frame, wherein said non-contact wheel alignment sensors are separate from said target adjustment frame and wherein said base frame is longitudinally moveable relative to said lift upon at least one rail with said base frame being in a known orientation relative to said non-contact wheel alignment sensors;

a computer system, said computer system configured to selectively actuate said actuators to position said target relative to the vehicle, with said target mount being moveable by said actuators about a plurality of axes;

wherein said computer system is configured to determine the orientation of the vehicle relative to said target adjustment frame based on the orientation of the tire and wheel assemblies of the vehicle and to actuate said actuators responsive to the determination of the orientation of the vehicle relative to said target adjustment frame to position said target relative to a sensor of the vehicle whereby the sensor is able to be calibrated using the target.

13. The system of claim 12, wherein said non-contact wheel alignment sensors comprise non-contact wheel alignment sensors for use in determining the orientation of each tire and wheel assembly of the vehicle.

14. The system of claim 13, wherein said non-contact wheel alignment sensors are movable longitudinally relative to the vehicle.

15. The system of claim 14, wherein said non-contact wheel alignment sensors comprise four pairs of non-contact wheel alignment sensors, wherein a separate pair of non-contact wheel alignment sensors is used in determining the orientation of each tire and wheel assembly of the vehicle.

16. The system of claim 12, wherein said actuators are operable to move said target mount longitudinally and laterally with respect to a longitudinal axis of the vehicle when positioned in front of said target adjustment frame, vertically, and rotationally about a vertical axis.

17. The system of claim 12, wherein said target is removable from said target mount, and wherein said system further includes a headlight aimer sensor, wherein said headlight aimer sensor is selectively mountable to said target mount, and wherein said computer system is configured to actuate said actuators responsive to the determination of the orientation of the vehicle relative to said target adjustment frame to position said headlight aimer sensor relative to a light projector of the vehicle whereby the orientation of the light projector of the vehicle is able to be determined using said headlight aimer sensor.

18. The system of claim 17, wherein said headlight aimer sensor includes a housing, a lens, an imaging surface and an imager, and wherein light projected by the light projector of the vehicle enters said housing through said lens and is projected upon said imaging surface inside said housing, and wherein said imager is operable to image the light projected on the imaging surface.

19. A method of aligning a target to a vehicle for calibration of a sensor equipped on the vehicle, said method comprising:

determining the orientation of tire and wheel assemblies of the vehicle using non-contact wheel alignment sensors that are disposed laterally relative to the vehicle, wherein each non-contact wheel alignment sensor is configured to project a light pattern onto a selected tire and wheel assembly and receive reflected images therefrom for determining the orientation of tire and wheel assemblies of the vehicle;

determining the orientation of the vehicle using the non-contact wheel alignment sensors; and positioning a target held by a target adjustment frame relative to the vehicle based on the determined orientation of the vehicle, wherein the target adjustment frame is separate from the non-contact wheel alignment sensors and is disposed longitudinally relative to the vehicle;

wherein the target adjustment frame includes a base frame, a target mount moveably mounted on said base frame with said target mount configured to support the target, said target adjustment frame further including a plurality of actuators configured to selectively move said target mount about a plurality of axes relative to said base frame, and wherein said base frame is in a known orientation to said non-contact wheel alignment sensors, and wherein said actuators are selectively actuated to position the target held by the target adjustment frame.

20. The method of claim 19, wherein said non-contact wheel alignment sensors are mounted to a vehicle lift.

* * * * *